United States Patent
Zhang et al.

(10) Patent No.: US 9,226,248 B2
(45) Date of Patent: Dec. 29, 2015

(54) MANAGING RESERVED CELLS AND USER EQUIPMENTS IN AN MBSFN ENVIRONMENT WITHIN A WIRELESS COMMUNICATION SYSTEM

(75) Inventors: Xiaoxia Zhang, San Diego, CA (US); Jun Wang, San Diego, CA (US); Mariam Motamed, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 13/461,602

(22) Filed: May 1, 2012

(65) Prior Publication Data
US 2012/0281611 A1 Nov. 8, 2012

Related U.S. Application Data

(60) Provisional application No. 61/482,910, filed on May 5, 2011.

(51) Int. Cl.
*H04W 52/52* (2009.01)
*H04W 52/24* (2009.01)
*H04W 52/14* (2009.01)

(52) U.S. Cl.
CPC ............ *H04W 52/52* (2013.01); *H04W 52/244* (2013.01); *H04W 52/143* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,600,424 B2 | 12/2013 | Chen et al. | |
| 2007/0293229 A1* | 12/2007 | Khan | 455/450 |
| 2009/0175179 A1 | 7/2009 | Stewart et al. | |
| 2009/0252075 A1 | 10/2009 | Ji et al. | |
| 2009/0252077 A1* | 10/2009 | Khandekar et al. | 370/312 |
| 2010/0080139 A1 | 4/2010 | Palanki et al. | |

(Continued)

FOREIGN PATENT DOCUMENTS

| EP | 2293635 A1 | 3/2011 |
|---|---|---|
| EP | 2299739 A1 | 3/2011 |

(Continued)

OTHER PUBLICATIONS

International Search Report and Written Opinion—PCT/US2012/036087—ISA/EPO—Oct. 5, 2012.

(Continued)

*Primary Examiner* — Habte Mered
(74) *Attorney, Agent, or Firm* — Arent Fox LLP

(57) ABSTRACT

In a first configuration, an apparatus determines subframes, in a radio frame, used by one or more neighboring BSs for providing services, and sends information to a UE indicating the determined subframes. In a second configuration, an apparatus determines subframes, in a radio frame, used by one or more neighboring BSs for providing services, transmits with a first power in remaining subframes other than the determined subframes in the radio frame, determines a second power based on the first power such that a difference between the second power and the first power is less than a threshold, and transmits with the second power in a subset of symbols in the determined subframes. In a third configuration, an apparatus receives information from a BS indicating subframes, in a radio frame, used by one or more neighboring BSs for providing services, and adjusts an AGC gain based on the indicated subframes.

28 Claims, 17 Drawing Sheets

(56) References Cited

U.S. PATENT DOCUMENTS

| | | | | |
|---|---|---|---|---|
| 2010/0113105 | A1* | 5/2010 | Xu et al. | 455/572 |
| 2010/0118992 | A1* | 5/2010 | Terabe | 375/260 |
| 2010/0172278 | A1* | 7/2010 | Nishio et al. | 370/312 |
| 2010/0189093 | A1* | 7/2010 | Palanki et al. | 370/344 |
| 2010/0254471 | A1* | 10/2010 | Ko et al. | 375/260 |
| 2010/0260154 | A1* | 10/2010 | Frank et al. | 370/336 |
| 2011/0053490 | A1 | 3/2011 | Wu | |
| 2011/0077006 | A1 | 3/2011 | Hsu | |
| 2011/0103290 | A1 | 5/2011 | Suzuki et al. | |
| 2011/0128903 | A1 | 6/2011 | Futaki et al. | |
| 2011/0261769 | A1* | 10/2011 | Ji et al. | 370/329 |
| 2012/0170498 | A1* | 7/2012 | Gustavsson et al. | 370/311 |

FOREIGN PATENT DOCUMENTS

| | | | |
|---|---|---|---|
| KR | 20050024558 | A | 3/2005 |
| WO | 2009157443 | A1 | 12/2009 |
| WO | 2010001928 | A1 | 1/2010 |
| WO | 2010148366 | A1 | 12/2010 |
| WO | 2011019835 | A2 | 2/2011 |
| WO | WO2012022717 | A1 | 2/2012 |

OTHER PUBLICATIONS

Partial International Search Report—PCT/US2012/036087—ISA/EPO—Jul. 30, 2012.
European Search Report—EP14167668—Search Authority—The Hague—Jun. 25, 2014.
Nokia, et al., "PMCH Reception Issue,"3GPP Draft; R1-101410, 3rd Generation Partnership Project (3GPP), Mobile Competence Centre; 650, Route Des Lucioles; F-06921 Sophia-Antipolis Cedex; France, vol. RAN WG1, no. San Francisco, USA; 20100222, Feb. 16, 2010, 2 pages, XP050418878, [retrieved on Feb. 16, 2010], the whole document.
Taiwan Search Report—TW101115613—TIPO—Aug. 21, 2014.
Translation of Office Action for Japanese Patent Application No. 2014-509381 dated Nov. 11, 2014.
Notice to File a Response for Korean Application No. 10-2013-7032185 dated May 31, 2015, 9 pages.

* cited by examiner

MANAGING RESERVED CELLS AND USER EQUIPMENTS IN AN MBSFN ENVIRONMENT WITHIN A WIRELESS COMMUNICATION SYSTEM

CROSS-REFERENCE TO RELATED APPLICATION(S)

This application claims the benefit of U.S. Provisional Application Ser. No. 61/482,910, entitled "Method and Apparatus for Managing Multicast/Broadcast Single Frequency Network (MBSFN) Area Reserved Cells in a Wireless Communication System" and filed on May 5, 2011, which is expressly incorporated by reference herein in its entirety.

BACKGROUND

1. Field

The present disclosure relates generally to communication systems, and more particularly, to managing reserved cells and user equipments (UEs) in a Multicast Broadcast Single Frequency Network (MBSFN) environment within a wireless communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a base station. The apparatus determines subframes, in a radio frame, used by one or more neighboring base stations for providing services. The apparatus sends information to a UE indicating the determined subframes.

In an aspect of the disclosure, a method, a computer program product, and an apparatus are provided. The apparatus may be a base station. The apparatus determines subframes, in a radio frame, used by one or more neighboring base stations for providing services. The apparatus transmits with a first power in remaining subframes other than the determined subframes in the radio frame. The apparatus determines a second power based on the first power such that a difference between the second power and the first power is less than a threshold. The second power is less than the first power. The apparatus transmits with the second power in a subset of symbols in the determined subframes.

In an aspect of the disclosure, a method, a computer program product, and an apparatus are provided. The apparatus may be a UE. The apparatus receives information from a base station indicating subframes, in a radio frame, used by one or more neighboring base stations for providing services. The apparatus adjusts an AGC gain based on the indicated subframes.

DETAILED DESCRIPTION

Figure 1:
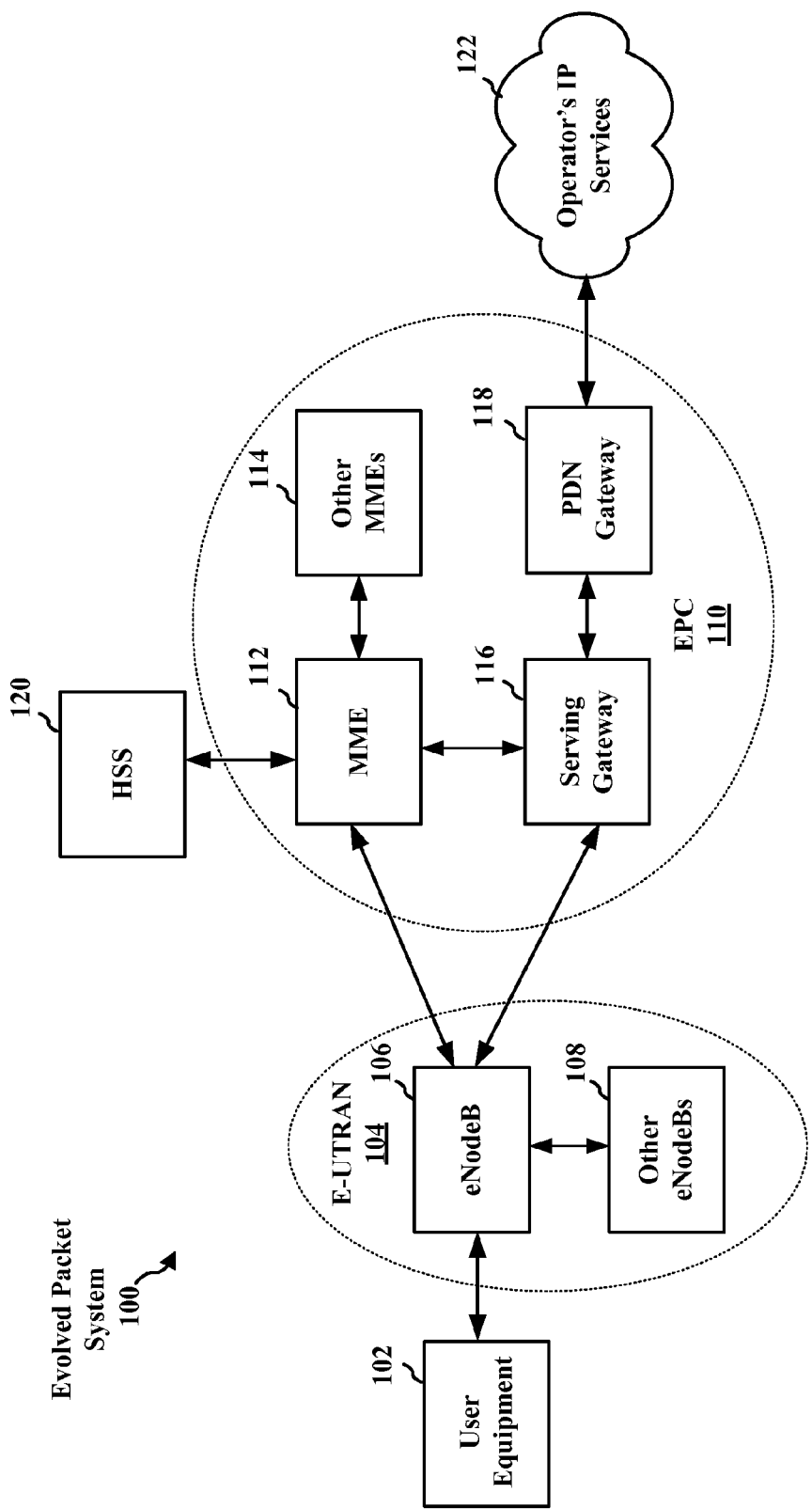
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
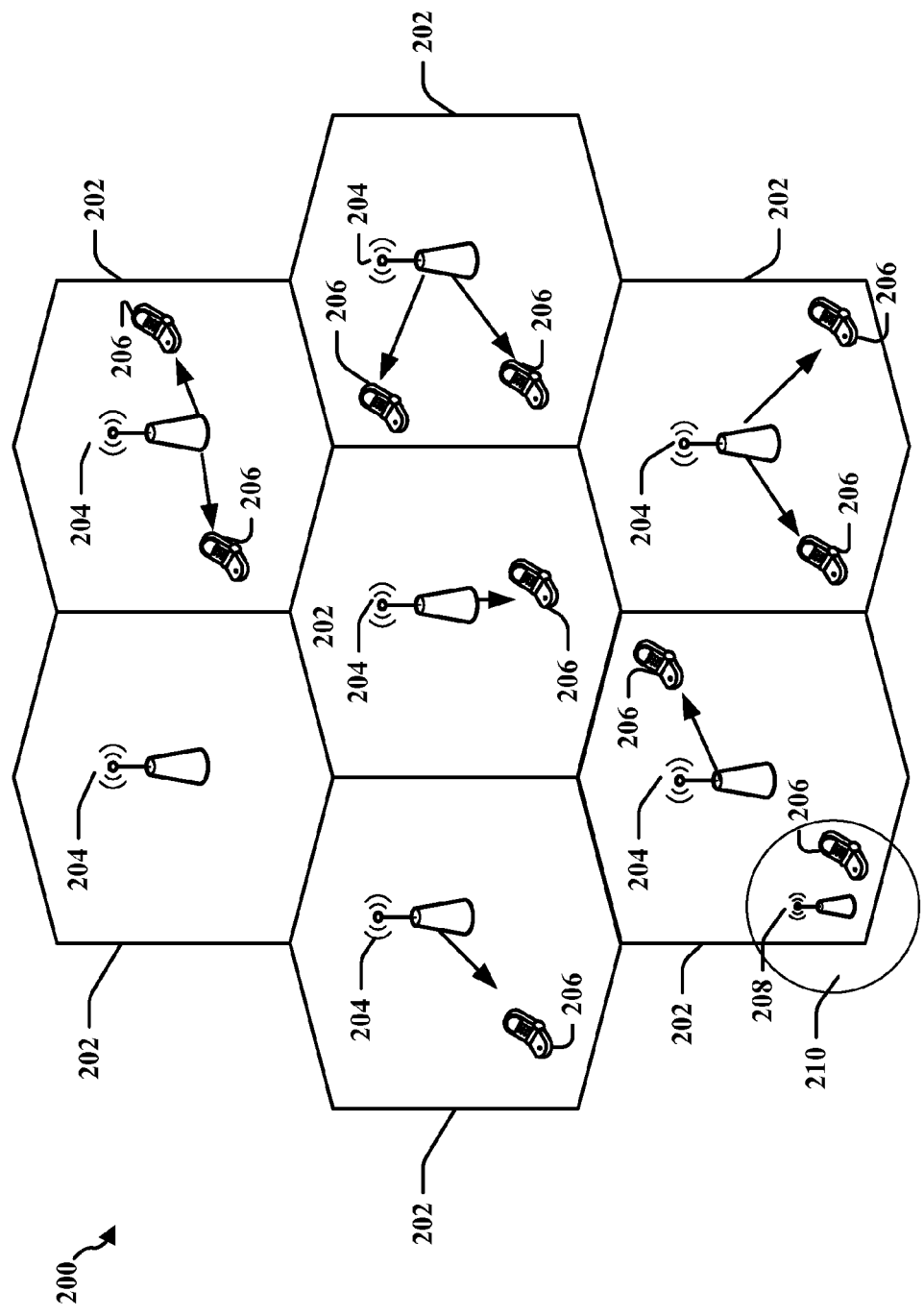
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
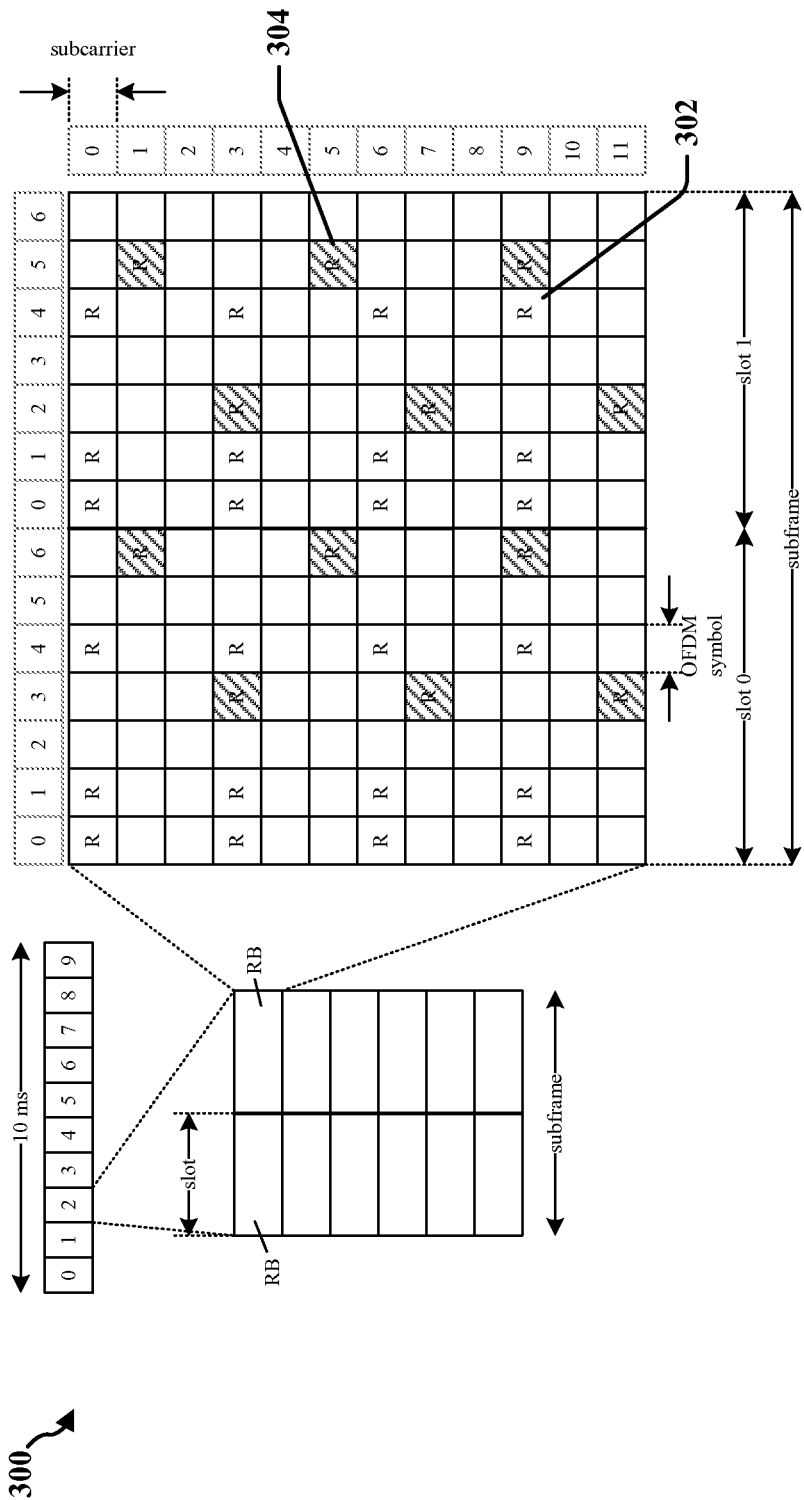
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
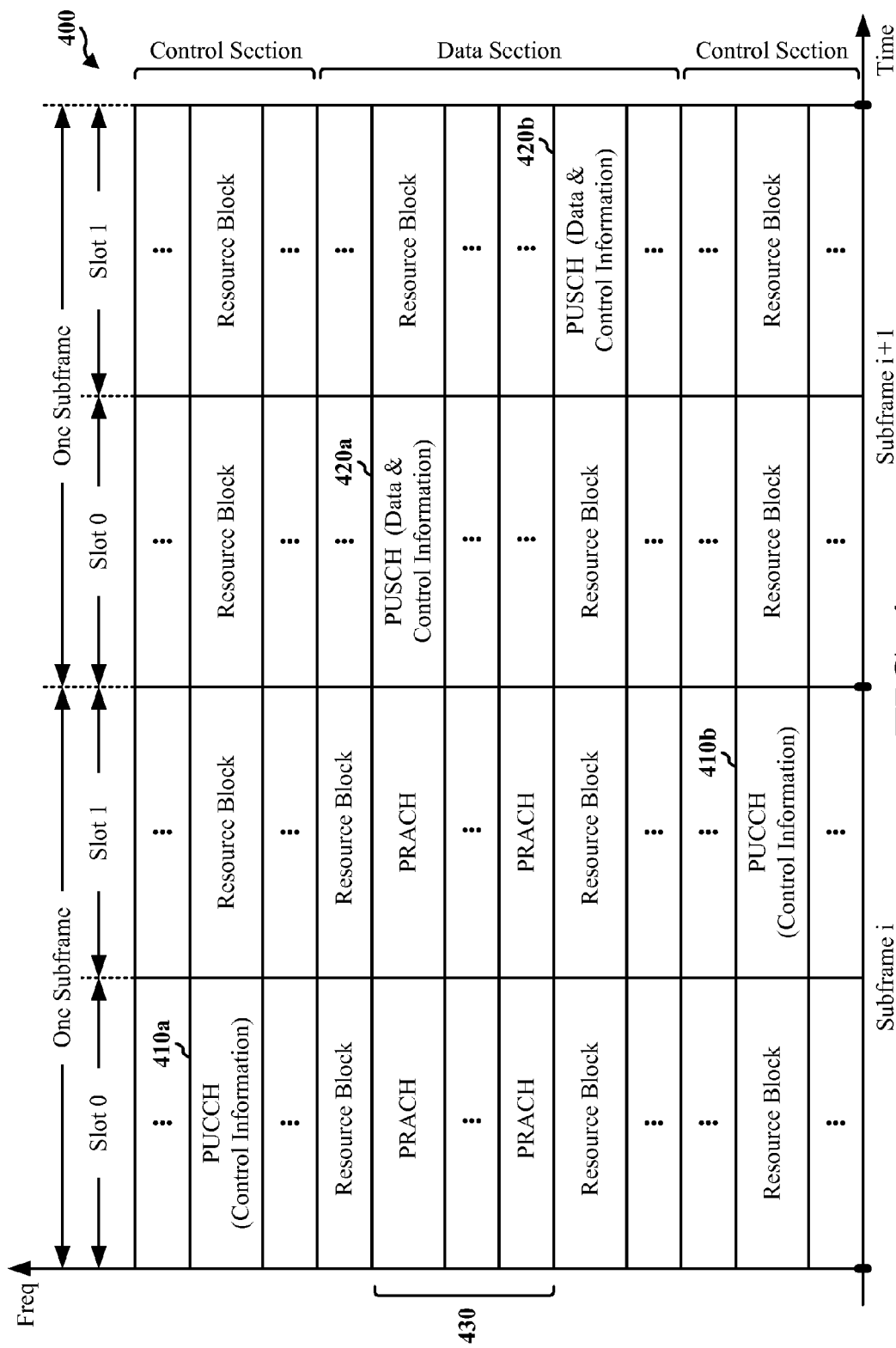
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
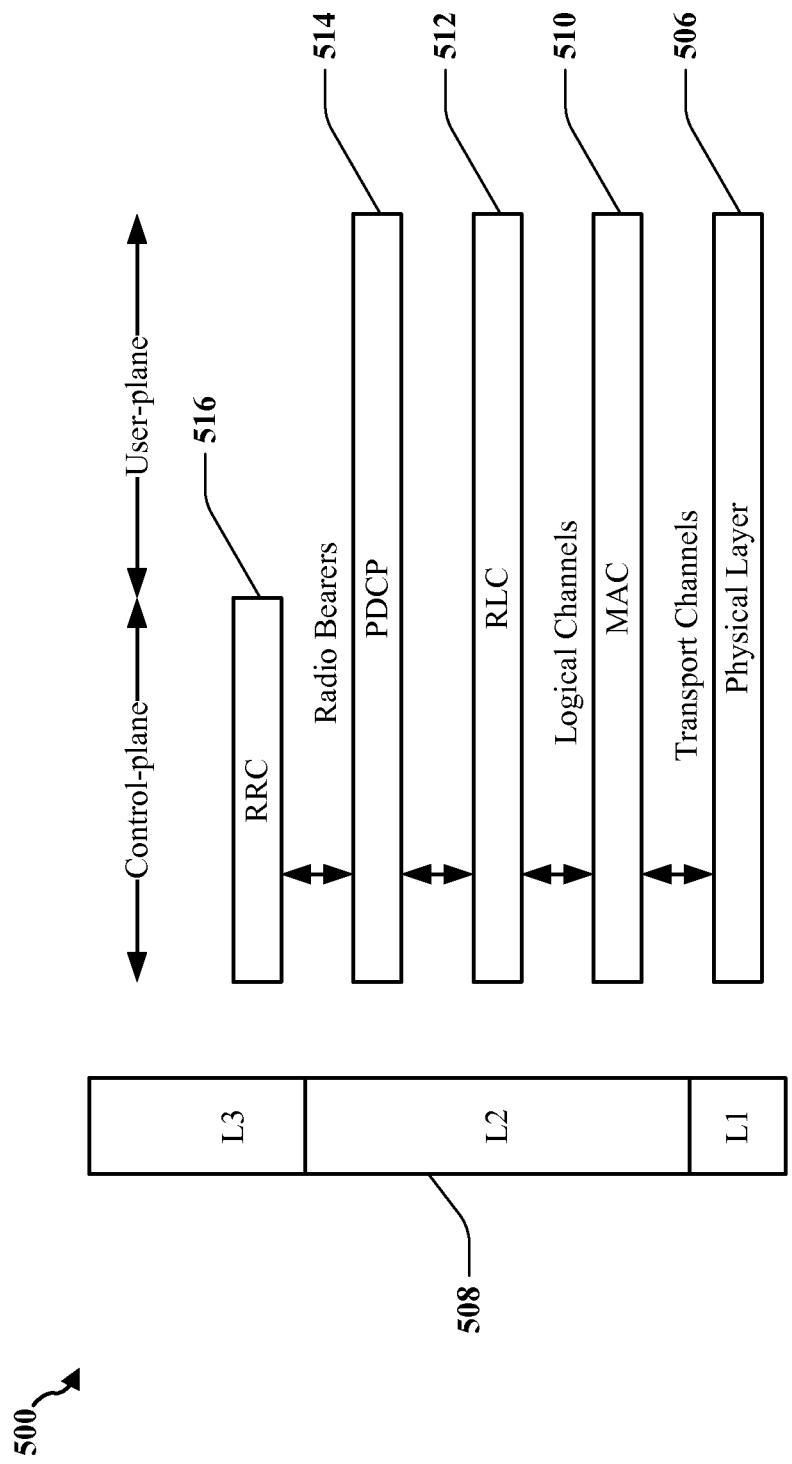
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
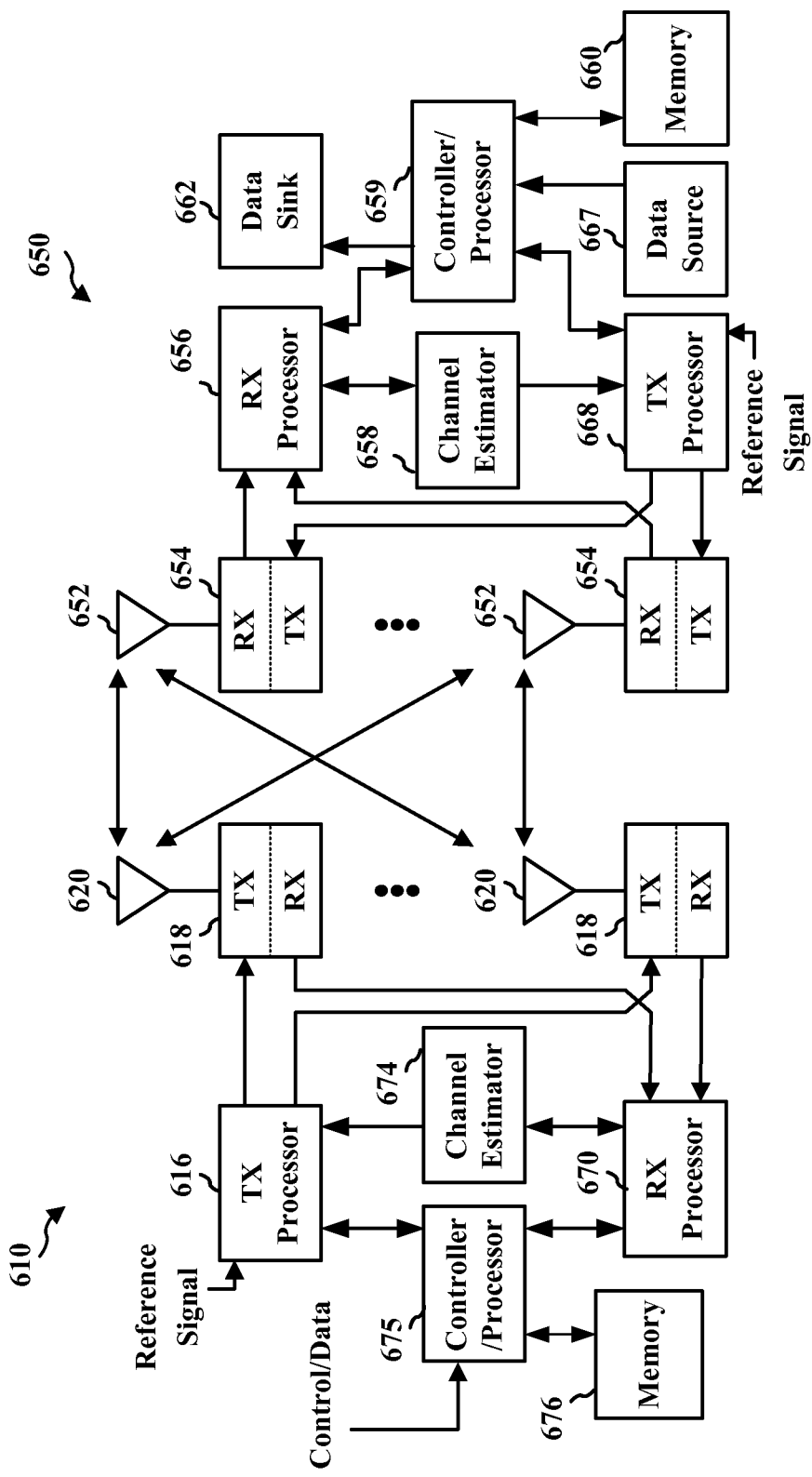
FIG. 6 is a diagram illustrating an example of an evolved Node B (eNB) and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
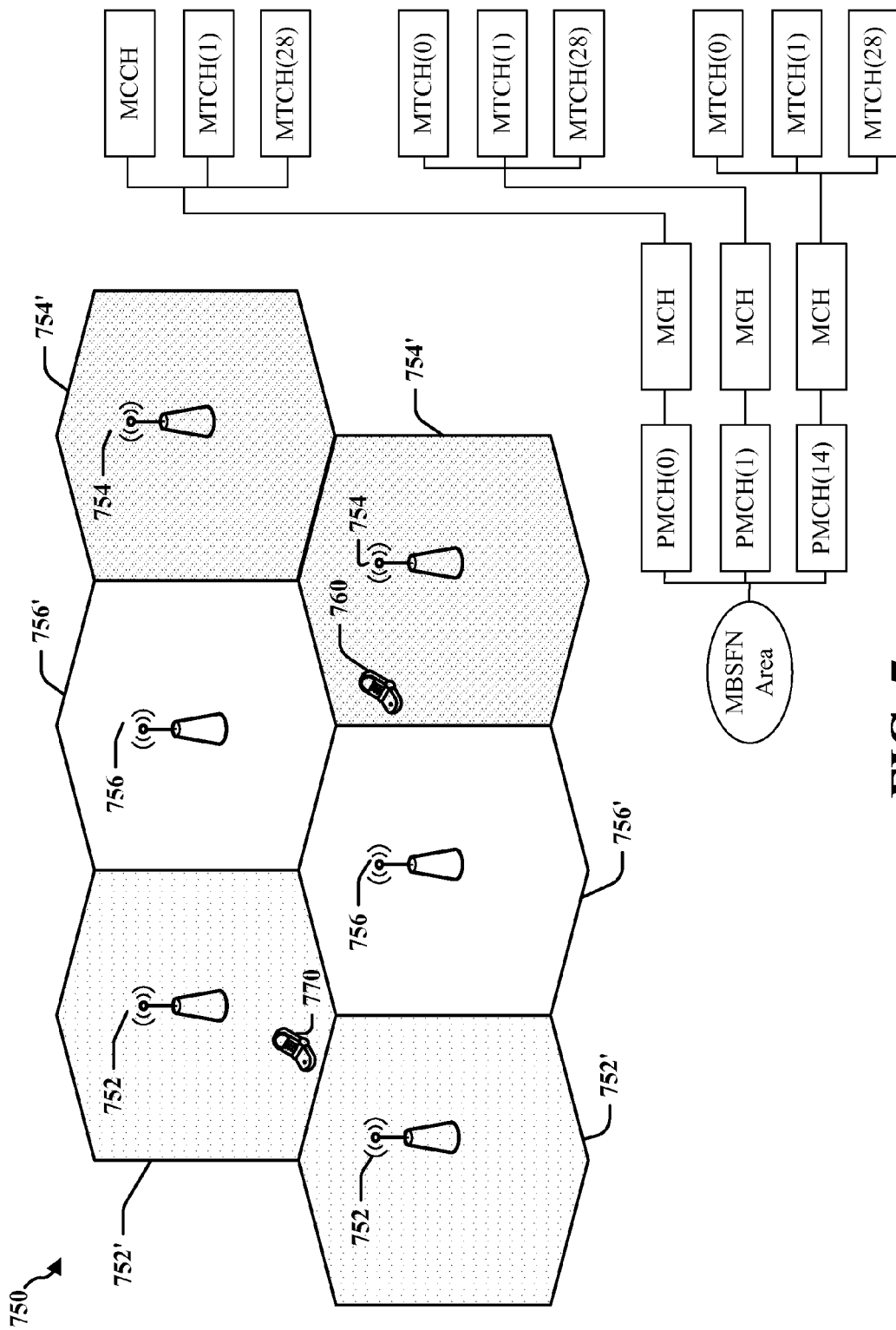
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752, 756 in cells 752', 756' may form a first MBSFN area and the eNBs 754, 756 in cells 754', 756' may form a second MBSFN area. (Alternatively, the eNBs 756 in cells 756' may be associated with only one of the first MBSFN area or the second MBSFN area.) The eNBs 752, 754, 756 may be associated with other MBSFN areas, for example, up to a total of eight MBSFN areas. A cell within an MBSFN area may be designated a reserved cell. For example, the cells 756' within the first and second MBSFN areas may be designated as reserved cells. Reserved cells do not provide multicast/broadcast content, but are time-synchronized to the cells 752', 754' and have restricted/reduced power on MBSFN resources in order to limit interference to the MBSFN areas. Each eNB except the reserved cells in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to the UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

As discussed supra, a reserved cell is a cell within an MBSFN area that does not contribute to the MBSFN transmission. In exemplary embodiments, a reserved cell may be allowed to transmit for other services, but at a restricted/reduced power on the resources allocated for the MBSFN transmission with the associated MBSFN area (e.g., one or more of the subframes 1, 2, 3, 6, 7, 8 within a radio frame for FDD and one or more of the subframes 3, 4, 7, 8, 9 for TDD). Accordingly, reserved cells may not advertise MBSFN subframe allocations in a system information block (SIB) 2 (SIB2). Furthermore, reserved cells may not transmit a SIB 13 or a physical downlink control channel (PDCCH) to notify of an MCCH change. Reserved cells may be known by the network, but transparent to UEs. As such, UEs may treat reserved cells as regular non-MBSFN unicast cells. Connected UEs may monitor the PDCCH on each subframe to check for a possible PDSCH/PUSCH assignment and may try to decode the corresponding physical HARQ indicator channel (PHICH) (which carries ACK/NACK feedback) according to the UL HARQ timeline. The reserved cell may reduce its transmit power on MBSFN resources for the MBSFN area. The reserved cell may not reduce its transmit power on the OFDM symbols corresponding to the control symbols in the MBSFN subframes for the MBSFN area (i.e., corresponding to the control symbols for MBSFN services broadcasted by neighboring eNBs in MBSFN subframes). For example, an eNB broadcasting MBSFN services may transmit control information in MBSFN subframes on OFDM symbols 0, 1, and PMCH on OFDM symbols 2-11 (configured with the extended cyclic prefix). Concurrently, a reserved cell may transmit control information at normal power on the OFDM symbols 0, 1 and at a restricted/reduced power on OFDM symbols 2-13 (assuming a normal cyclic prefix configuration).

The PHICH duration (i.e., OFDM symbol span) may be semi-statically configured and may be normal or extended depending on the configuration specified in the physical broadcast channel (PBCH). The normal PHICH duration may be one for both non-MBSFN subframes (e.g., subframes 0, 4, 5, 9, and zero or more of the subframes 1, 2, 3, 6, 7, 8) and MBSFN subframes (e.g., zero or more of the subframes 1, 2, 3, 6, 7, 8). The extended PHICH duration may be three for non-MBSFN subframes and two for MBSFN subframes. The PDCCH duration in non-MBSFN subframes may be one, two, or three for $N_{RB}^{DL}>10$ and two, three, or four for $N_{RB}^{DL}\leq 10$. The PHICH duration provides a lower bound for the PDCCH duration. The PDCCH duration in MBSFN subframes may be one or two for $N_{RB}^{DL}>10$ and two for $N_{RB}^{DL}\leq 10$. Accordingly, in subframes (herein referred to as "reserved subframes") of the reserved cell that are concurrent with MBSFN subframes of neighboring eNBs, the control may span one, two, or three OFDM symbols when $N_{RB}^{DL}>10$ and the normal PHICH duration is configured; three OFDM symbols when $N_{RB}^{DL}>10$ and the extended PHICH duration is configured; two, three, or four OFDM symbols when $N_{RB}^{DL}\leq 10$ and the normal PHICH duration is configured; and three or four OFDM symbols when $N_{RB}^{DL}\leq 10$ and the extended PHICH duration is configured. However, the control for MBSFN subframes may span one or two OFDM symbols when $N_{RB}^{DL}>10$ and the normal PHICH duration is configured, and two OFDM symbols when $N_{RB}^{DL}<10$ or $N_{RB}^{DL}>10$ and the extended PHICH duration is configured.

In reserved subframes, a reserved cell may transmit at normal power on control/data symbols that collide with control symbols in MBSFN subframes in the MBSFN area and at restricted/reduced power on control/data symbols that collide with PMCH symbols. If the extended PHICH duration is configured, the third control symbol of reserved subframes may always collide with the PMCH symbols of MBSFN subframes. For example, if control symbols span two OFDM symbols in the MSBFN subframes and three OFDM symbols in reserved subframes, the reserved cell may transmit at normal power in the first and second OFDM symbols of the reserved subframes and at restricted/reduced power in the third OFDM symbol of the reserved subframes.

Rather than vary power across OFDM symbols within reserved subframes, a reserved cell may always transmit at a restricted/reduced power in reserved subframes. Accordingly, reserved cell power variation may be between non-reserved subframes and reserved subframes or between OFDM symbols within the reserved subframes. The reserved cell power variation may cause automatic gain control (AGC) gain adjustment issues and/or decoding issues related to an actual traffic to pilot (T/P) ratio being lower than the T/P ratio signaled (semi-statically) by the reserved cell. With respect to the AGC gain, UEs may determine an energy of received symbols and adjust an AGC gain based on the determined energy. When the energy varies significantly across symbols, especially across subframes, UEs may boost the AGC gain unnecessarily, which can cause signal clipping in the non-reserved regular unicast subframes/symbols. With respect to the T/P ratio, UEs may be signaled a T/P ratio from their serving reserved cell. UEs may use the signaled T/P ratio when decoding signals received in OFDM symbols based on single user MIMO (SU-MIMO) or multiuser MIMO (MU-MIMO), or modulated based on 16-QAM or 64-QAM. When the actual T/P ratio in OFDM symbols varies from the signaled T/P ratio, UEs may have difficulty decoding control information/data in those OFDM symbols. Accordingly, methods are needed to reduce UE AGC gain adjustment, decoding errors, and/or other issues related to reserved cell power variation across subframes/symbols.

Figure 8:
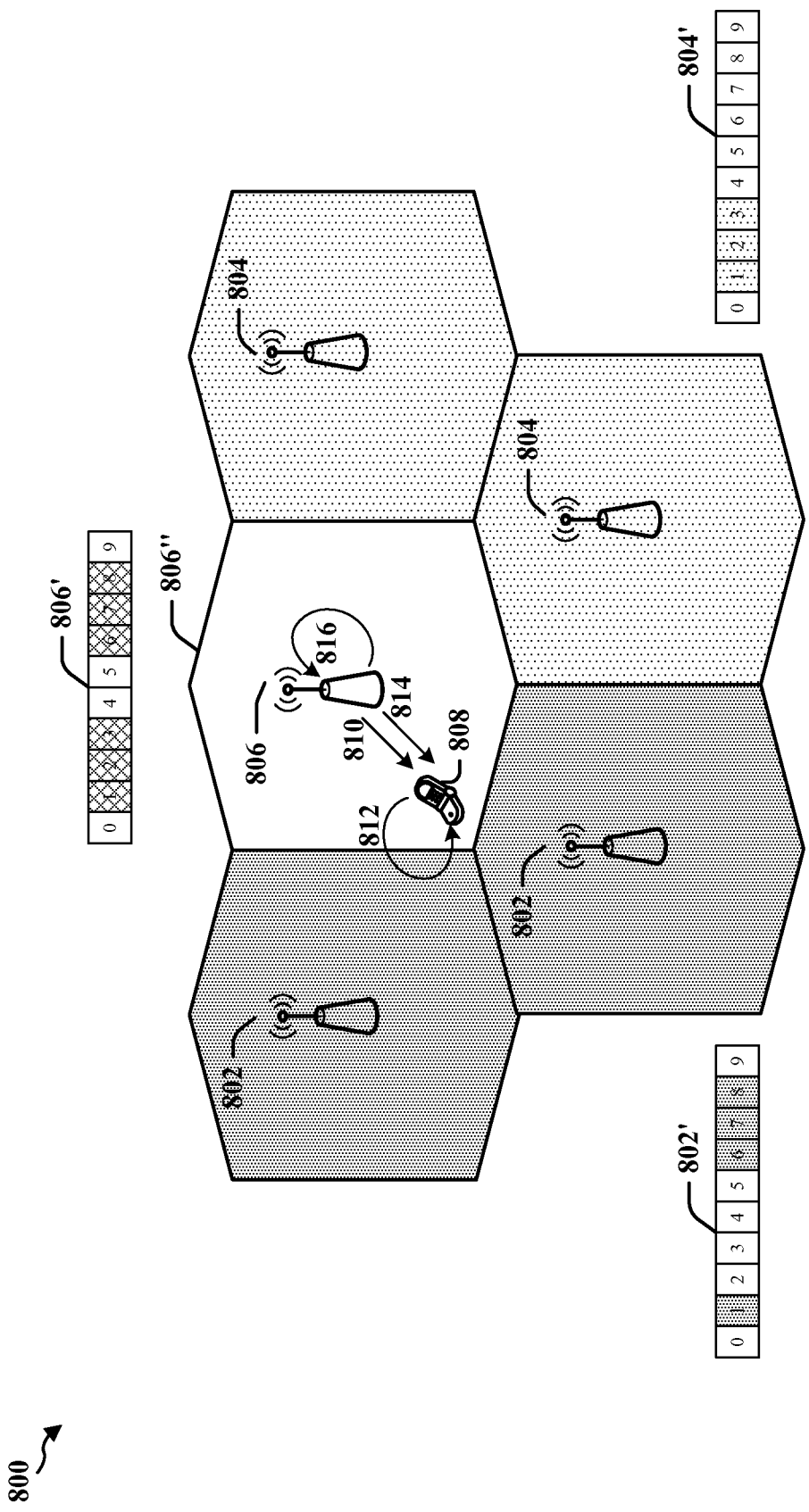
FIG. 8 is a first diagram for illustrating exemplary methods.

FIG. 8 is a first diagram 800 for illustrating exemplary methods. The eNBs 802 within a first MBSFN area broadcast MBSFN services in MBSFN subframes 1, 6, 7, and 8 within a radio frame 802'. Remaining subframes within the radio frame 802' carry unicast transmissions. The eNBs 804 within a second MBSFN area broadcast MBSFN services in MBSFN subframes 1, 2, and 3 within a radio frame 804'. Remaining subframes within the radio frame 804' carry unicast transmissions. The eNB 806 within the reserved cell 806" may be within the first MBSFN area, the second MBSFN area, or both the first and second MBSFN areas. According to an exemplary method, the eNB 806 determines subframes, in a radio frame', used by one or more neighboring eNBs 802 and/or 804 for broadcasting MBSFN services. For example, if the neighboring eNBs 802 use subframes 1, 6, 7, and 8 for broadcasting MBSFN services and the neighboring eNBs 804 use subframes 1, 2, and 3 for broadcasting MBSFN services, the eNB 806 may determine that subframes 1, 2, 3, 6, 7, and 8 are used by neighboring eNBs 802, 804 for broadcasting MBSFN services. The eNB 806 may then determine to configure one or more of the subframes 1, 6, 7, 8 as reserved subframes, to configure one or more of the subframes 1, 2, 3 as reserved subframes, or to configure one or more of the subframes 1, 2, 3, 6, 7, 8 as reserved subframes. Assume the eNB 806 determines to configure subframes 1, 2, 3, 6, 7, 8 of the radio frame 806' as reserved subframes. Upon determining the reserved subframes in the radio frame 806', the eNB 806 may send information 810 to a UE 808 indicating the reserved subframes. Based on the received information 810, the UE 808 may adjust 812 an AGC gain.

The determined subframes 1, 2, 3, 6, 7, and 8 may be referred to as reserved subframes. In the reserved subframes, the eNB 806 may vary a power of a unicast DL transmission 814 to the UE 808. In a first configuration, the eNB 806 transmits 814 in non-reserved unicast subframes 0, 4, 5, and 9 with a normal power and in reserved subframes 1, 2, 3, 6, 7, and 8 at a restricted/reduced power. In a second configuration, the eNB 806 transmits 814 in non-reserved unicast subframes 0, 4, 5, and 9 with a normal power and in reserved subframes 1, 2, 3, 6, 7, and 8 at both a normal power and a restricted/reduced power. In such a configuration, in the OFDM symbols within the reserved subframes that collide with OFDM symbols carrying control information from the neighboring eNBs 802, 804, the eNB 806 transmits 814 at normal power, and in the OFDM symbols within the reserved subframes that collide with OFDM symbols carrying PMCH from the neighboring eNBs 802, 804, the eNB 806 transmits 814 at a restricted/reduced power.

The information 810 may also indicate the power variation between the reserved subframes and non-reserved subframes and/or the power variation between the symbols within the reserved subframes. The power variation information within the information 810 may indicate the normal power and the restricted/reduced power, a difference between a normal power and the restricted/reduced power, a ratio of the normal power and the restricted/reduced power, or some other metric that indicates the power variation between the normal power and restricted/reduced power transmissions. The UE 808 may adjust 812 its AGC gain based on the received power variation information. In addition to the power variation, the information 810 may also indicate a T/P ratio for the control information/data received at a restricted/reduced power in OFDM symbols/subframes. When the restricted/reduced power DL transmissions 814 are based on SU-MIMO, MU-MIMO, 16-QAM, or 64-QAM, the UE 808 may decode the restricted/reduced power DL transmissions 814 based on both the indicated T/P ratio and the power variation information indicated in the information 810.

In one configuration, the eNB 806 does not transmit the information 810 indicating the reserved subframes, power variation information, and the T/P ratio for the restricted/reduced power transmissions. In such a configuration, the UE 808 does not perform step 812. Rather, the eNB 806 limits the reduction in power for the DL transmissions 814 in order to reduce AGC gain adjustment issues and decoding issues (when the DL transmissions 814 are based on SU-MIMO, MU-MIMO, 16-QAM, or 64-QAM) at the UE 808. When limiting the reduction in power for the DL transmissions 814, the eNB 806 determines 816 a restricted/reduced power based on the normal power for the DL transmissions 814 such that a difference between the normal power and the restricted/reduced power is less than a threshold. The threshold may be determined based on an allowed performance loss at the UE 808 due to AGC gain adjustment issues and decoding issues related to the actual T/P ratio being less than the signaled T/P ratio when the DL transmissions 814 are based on SU-MIMO, MU-MIMO, 16-QAM, or 64-QAM.

In addition, the eNB 806 may try to align the control information in the reserved subframes 1, 2, 3, 6, 7, 8 with the control information in the MBSFN subframes of the neighboring eNBs 802, 804. For example, if the neighboring eNBs 802, 804 have a PDCCH duration of two, the eNB 806 may try to configure a PDCCH duration of two or less. By aligning the control information, the UE 808 will have no performance loss in relation to receiving and decoding the control information. Furthermore, the eNB 806 may try to configure a PDCCH duration equal to the PDCCH duration of the neighboring eNB 802, 804. By configuring the same PDCCH duration, the actual T/P across OFDM symbols carrying PDSCH will be the same. As part of the alignment of the control information, the eNB 806 may refrain from configuring an extended PHICH duration (e.g., three OFDM symbols) and determine to use a normal PHICH duration (e.g., one OFDM symbol). Assuming there are no more than two OFDM symbols carrying control information in MBSFN subframes, configuring an extending PHICH duration would prevent alignment of the control information in reserved subframes with the control information in the MBSFN subframes. The eNB 806 may also try to schedule the UE 808 with a QPSK rank 1 single user transmission in the reserved subframes to avoid a T/P variation issue.

As discussed supra, in a first configuration, the eNB 806 may indicate its reserved subframes and may provide power variation information and a T/P ratio for the restricted/reduced DL transmissions to the UE 808. The information provided to the UE 808 allows the UE 808 to reduce a negative impact on AGC gain adjustment and decoding due to the power variation associated with the reserved subframes (i.e., between the reserved subframes and the remaining subframes and/or between OFDM symbols within the reserved subframes). In a second configuration, the reserved subframes may be completely transparent to the UE 808. In the second configuration, in order to reduce a negative impact on AGC gain adjustment and decoding due to the power variation associated with the reserved subframes, the eNB 806 may limit the reduction of the power (e.g., maintain a difference between the restricted/reduced power and the normal power to be less than a threshold) of the DL transmissions, try to align the control symbols in the reserved subframes with the control symbols of the MBSFN subframes of the one or more neighboring eNBs, and try to schedule single user QPSK rank 1 transmissions. In a third configuration, the eNB 806 may not be configured as a reserved cell. In the third configuration, the eNB 806 does not transmit control information/data with restricted/reduced power on subframes that are concurrent with MBSFN subframes of one or more neighboring eNBs. By not restricting/reducing its power, the UE 808 does not encounter AGC gain adjustment and decoding issues due to a power variation.

Figure 9:
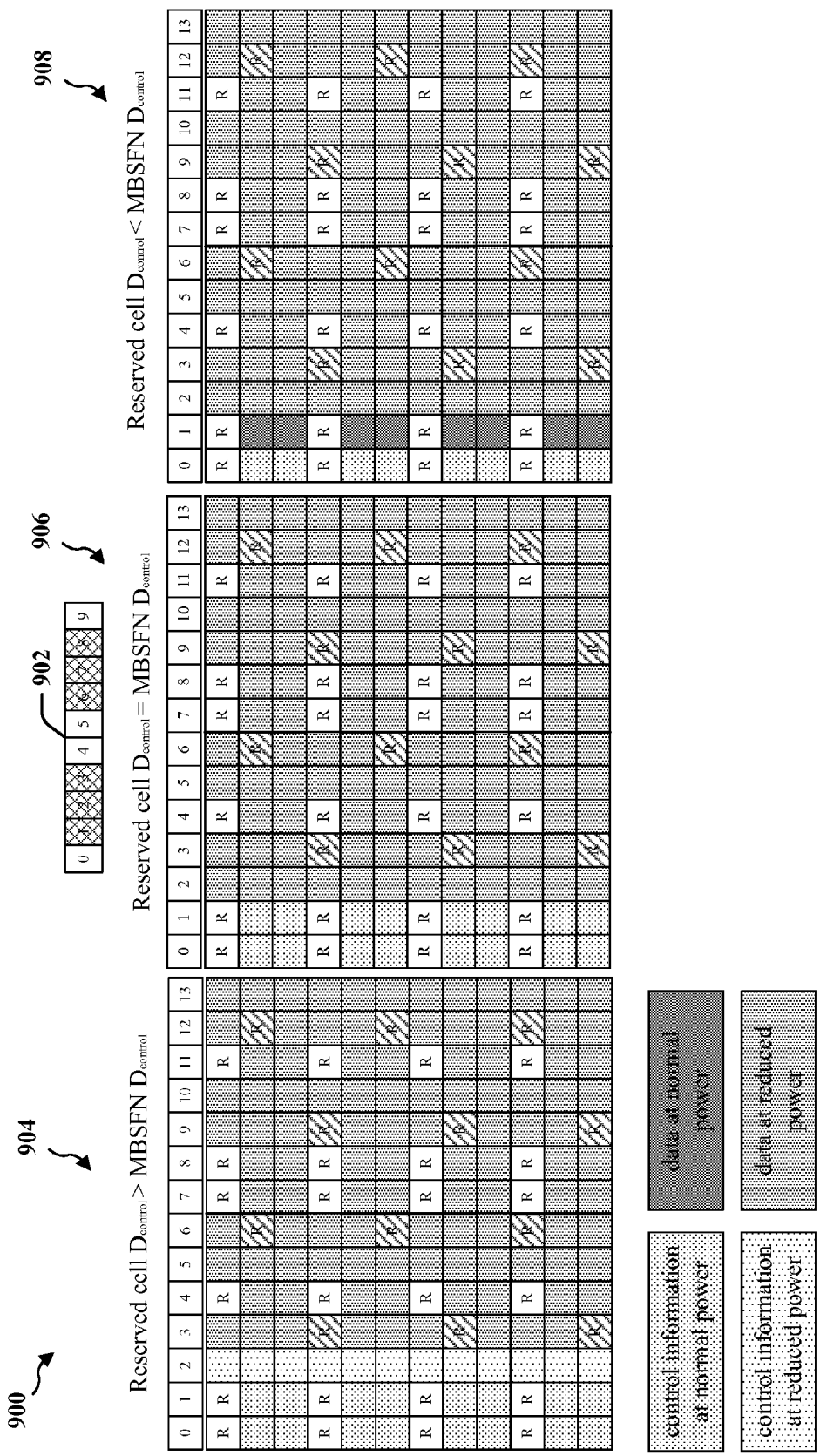
FIG. 9 is a second diagram for illustrating exemplary methods.

FIG. 9 is a second diagram 900 for illustrating exemplary methods. As discussed supra, a reserved cell may transmit control information/data in non-reserved unicast subframes at a normal power and in reserved subframes at a restricted/reduced power. Alternatively, in reserved subframes, a reserved cell may transmit control information/data at a normal power in the OFDM symbols that overlap/collide with OFDM symbols of MBSFN subframes carrying control information, and transmit control information/data at a restricted/reduced power in OFDM symbols that overlap/collide with OFDM symbols of MBSFN subframes carrying PMCH. Such a power variation across OFDM symbols in reserved subframes is illustrated in FIG. 9.

As shown in FIG. 9, assume a reserved cell determines that neighboring eNBs are using subframes 1, 2, 3, 6, 7, 8 for broadcasting MBSFN services. As such, for the reserved cell, the subframes 1, 2, 3, 6, 7, 8 of a radio frame 902 may be treated as reserved subframes with power variation across the OFDM symbols. Assume also that for the reserved subframes, the reserved cell determines that the neighboring eNBs transmit two OFDM symbols of control information and ten OFDM symbols of PMCH (total of 12 OFDM symbols in the extended cyclic prefix configuration). The subframes 904, 906, 908 are illustrated with 14 OFDM symbols in a normal cyclic prefix configuration. In the subframe 904, the PDCCH/PHICH duration is three OFDM symbols. In the subframe 904, the reserved cell transmits control information at a normal power in the OFDM symbols 0, 1, control information at a restricted/reduced power in the OFDM symbol 2, and data (e.g., PDSCH) at a restricted/reduced power in the OFDM symbols 3-13. In the subframe 906, the PDCCH/PHICH duration is two OFDM symbols. In the subframe 906, the reserved cell transmits control information at a normal power in the OFDM symbols 0, 1 and data at a restricted/reduced power in the OFDM symbols 2-13. For subframe 906, the restricted/reduced power may be equal to zero, and therefore the reserved cell may not transmit any data. In the subframe 908, the PDCCH/PHICH duration is one OFDM symbol. In the subframe 908, the reserved cell transmits control information at a normal power in the OFDM symbol 0, data at a normal power in the OFDM symbol 1, and data at a restricted/reduced power in the OFDM symbols 2-13.

Figure 10:
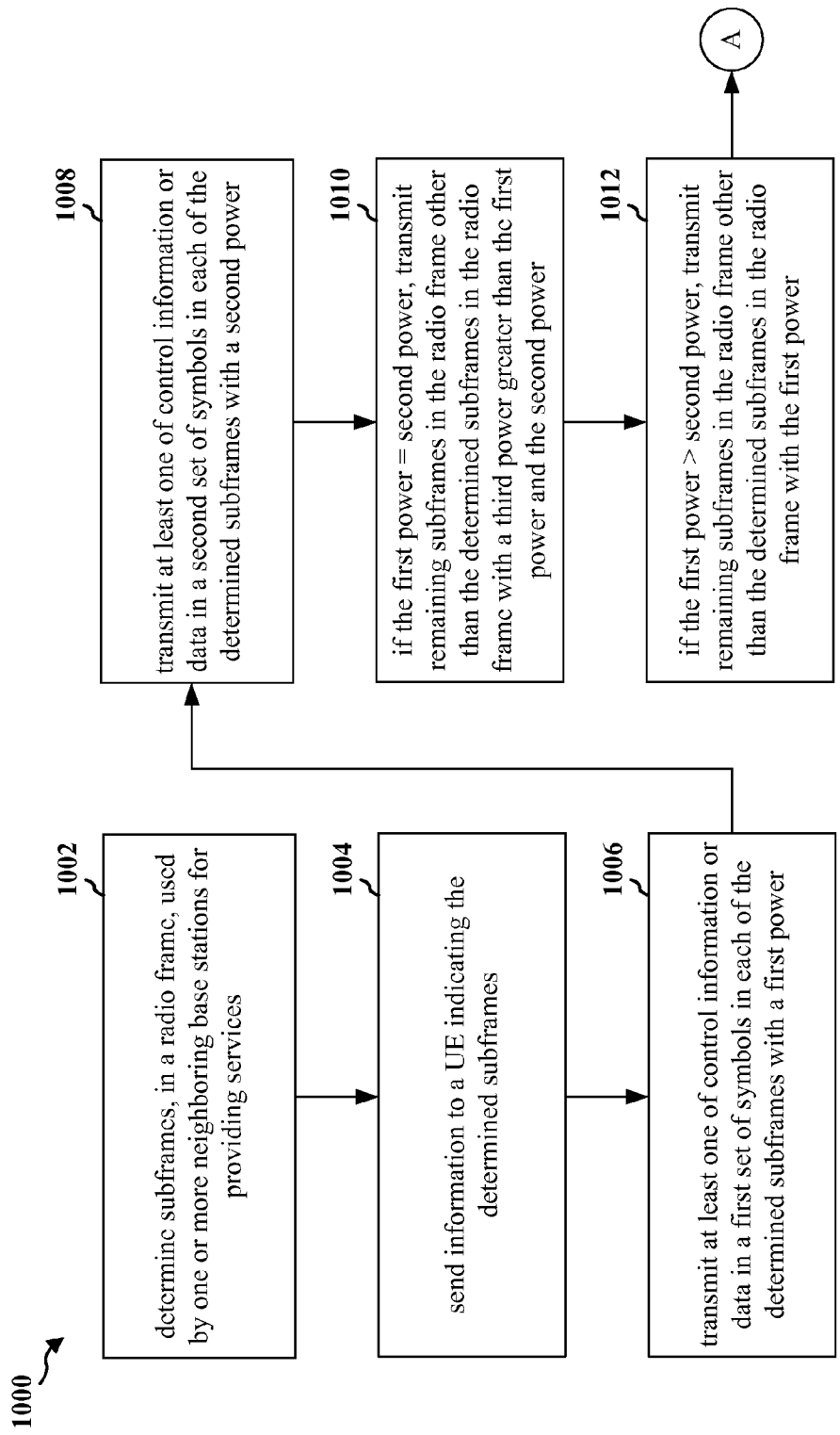
FIG. 10 is a flow chart of a first method of wireless communication.

FIG. 10 is a flow chart 1000 of a first method of wireless communication. The method may be performed by a base station/eNB, such as the reserved cell 806. In step 1002, a base station determines subframes, in a radio frame, used by one or more neighboring base stations for providing (e.g., broadcasting) services. In step 1004, the base station sends information to a UE indicating the determined subframes. The information may further indicate a power variation between determined subframes and remaining subframes in the radio frame and/or symbols within the determined subframes. In step 1006, the base station may transmit control information and/or data in a first set of symbols in each of the determined subframes with a first power. In step 1008, the base station may transmit control information and/or data in a second set of symbols in each of the determined subframes with a second power. The first power may be equal to the second power. In such a configuration, in step 1010, the base station may transmit remaining subframes in the radio frame other than the determined subframes in the radio frame with a third power greater than the first power and the second power. The second power may be less than the first power. In such a configuration, in step 1012, the base station may transmit remaining subframes in the radio frame other than the determined subframes in the radio frame with the first power. After step 1012, the base station may continue to point A, which is continued in FIG. 12. The determined subframes may be concurrent with MBSFN subframes used by the one or more neighboring base stations. The symbols may be OFDM symbols.

For example, referring to FIGS. 8, 9, the eNB 806 may determine that subframes 1, 2, 3, 6, 7, 8 in a radio frame are used by the neighboring eNBs 802, 804 for broadcasting MBSFN services. The eNB 806 may then determine that the subframes 1, 2, 3, 6, 7, 8 are reserved subframes within the radio frame 806'. The eNB 806 sends information 810 to the UE 808 indicating the determined/reserved subframes 1, 2, 3, 6, 7, 8. The information 810 may further indicate a power variation between the reserved subframes 1, 2, 3, 6, 7, 8 and remaining subframes 0, 4, 5, 9 in the radio frame 806' and/or OFDM symbols within the reserved subframes 1, 2, 3, 6, 7, 8. The eNB 806 may transmit control information and/or data in a first set of symbols in each of the reserved subframes with a first power. The first set of symbols may be the OFDM symbols that are concurrent with or collide with the control symbols within the MBSFN subframes of the neighboring eNBs 802, 804. The eNB 806 may transmit control information and/or data in a second set of symbols in each of the determined subframes with a second power. The second set of symbols may be the OFDM symbols that are concurrent with or collide with the PMCH symbols within the MBSFN subframes of the neighboring eNBs 802, 804. The first power may be equal to the second power, and both the first power and the second power may be a restricted/reduced power. In such a configuration, the eNB 806 may transmit control information/data in the reserved subframes 1, 2, 3, 6, 7, 8 at the restricted/reduced power (equal to the first power and the second power) and transmit control information/data in the remaining non-reserved subframes 0, 4, 5, 9 at a third power. The third power may be equal to a normal, non-restricted/non-reduced power. If the second power is less than the first power, the second power may be a restricted/reduced power and the first power may be a normal, non-restricted/non-reduced power. The subframes 904, 906, 908 illustrate such a power variation across OFDM symbols for the transmission of control information/data within the reserved subframes.

Figure 11:
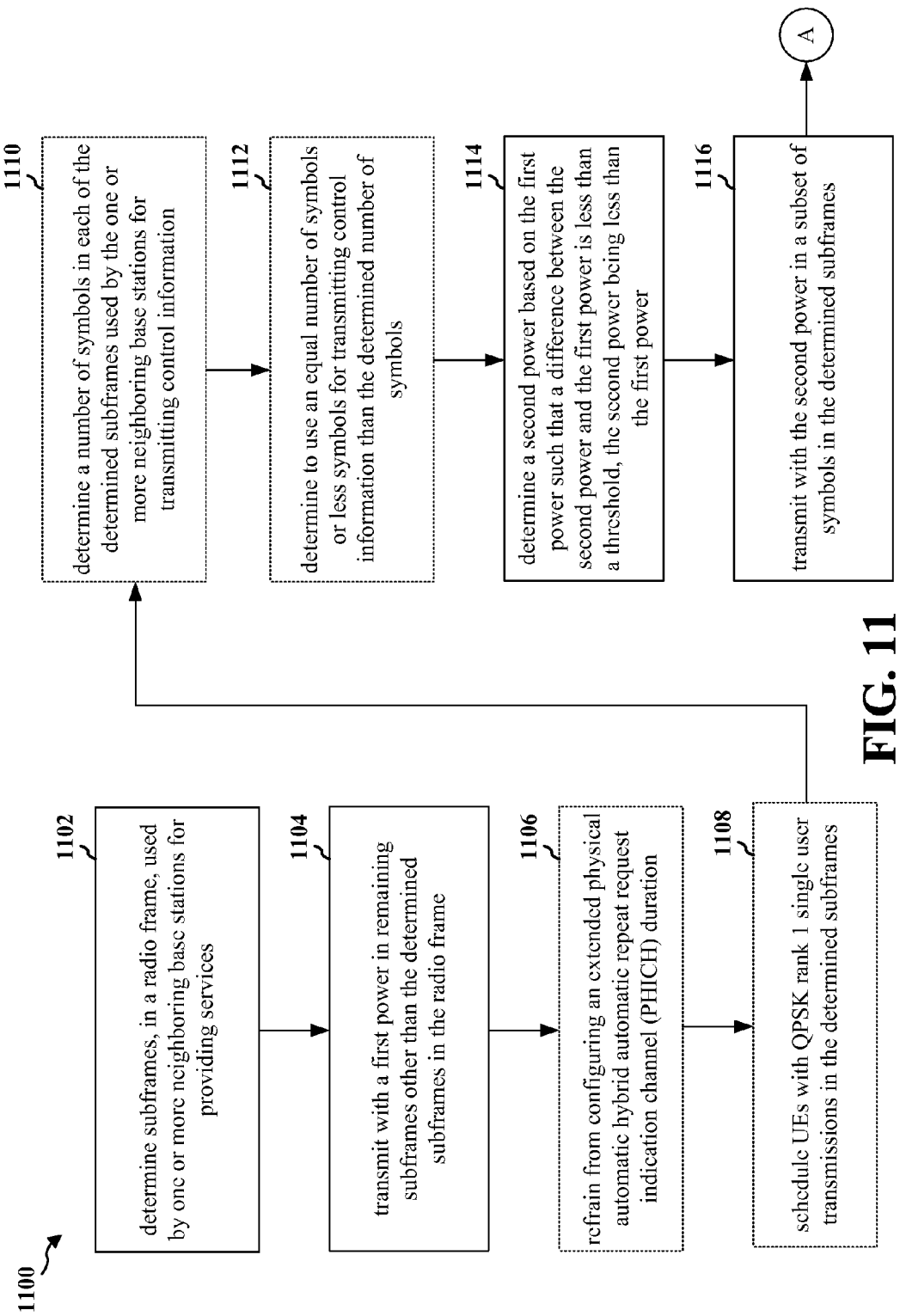
FIG. 11 is a flow chart of a second method of wireless communication.

FIG. 11 is a flow chart 1100 of a second method of wireless communication. The method may be performed by a base station/eNB, such as the eNB 806. In step 1102, a base station determines subframes, in a radio frame, used by one or more neighboring base stations for providing services. In step 1104, the base station transmits with a first power in remaining subframes other than the determined subframes in the radio frame. In step 1114, the base station determines a second power less than the first power and based on the first power such that a difference between the second power and the first power is less than a threshold. In step 1116, the base station transmits with the second power in a subset of symbols in the determined subframes. After step 1116, the base station may continue to point A, which is continued in FIG. 12.

For example, referring to FIG. 8, the eNB 806 may determine that subframes 1, 2, 3, 6, 7, 8 in a radio frame are used by the eNBs 802, 804 for broadcasting MBSFN services. The eNB 806 may then determine that the subframes 1, 2, 3, 6, 7, 8 are reserved subframes within the radio frame 806'. The eNB 806 may transmit control information/data at a first power (e.g., normal, non-restricted/non-reduced power) in the remaining subframes 0, 4, 5, 9 other than the reserved subframes 1, 2, 3, 6, 7, 8 in the radio frame 806'. The eNB 806 may determine a second power (e.g., restricted/reduced power) based on the first power such that a difference between the second power and the first power is less than a threshold. The eNB 806 may transmit control information/data at the second power in a subset of symbols in the reserved subframes 1, 2, 3, 6, 7, 8. The subset of symbols includes the OFDM symbols that are concurrent with or collide with the PMCH symbols in the MBSFN subframes of the eNBs 802, 804. Assume the eNBs 802, 804 transmit control information in OFDM symbols 0, 1 and PMCH in OFDM symbols 2-11 within the MBSFN subframes 1, 2, 3, 6, 7, 8. In a first configuration, the eNB 806 may transmit control information/data on all the OFDM symbols 0-13 of the reserved subframes 1, 2, 3, 6, 7, 8 at the second power. In a second configuration, the eNB 806 may transmit control information/data on the OFDM symbols 0, 1 of the reserved subframes 1, 2, 3, 6, 7, 8 at the first power and on the OFDM symbols 2-13 of the reserved subframes 1, 2, 3, 6, 7, 8 at the second power.

In steps 1110, 1112 the base station may try to align control symbols in the reserved subframes with control symbols in the MBSFN subframes. Specifically, in step 1110, the base station may determine a number of symbols in each of the determined subframes used by the one or more neighboring base stations for transmitting control information. In step 1112, the base station may determine to use an equal number of symbols or less symbols for transmitting control information than the determined number of symbols. In step 1106, in order to align the control symbols in the reserved subframes with the control symbols in the MBSFN subframes, the base station may refrain from configuring an extended PHICH duration (e.g., with an OFDM symbol span of three) and instead configure a normal PHICH duration (e.g., with an OFDM symbol span of one). In step 1108, the base station may try to schedule UEs with QPSK rank 1 single user transmissions in the determined subframes in order to avoid the T/P variation issue when the UE uses the signaled T/P ratio to decode signals received through SU-MIMO, MU-MIMO, 16-QAM, or 64-QAM. The restricted/reduced power results in a smaller T/P ratio than the signaled T/P ratio (which cannot change dynamically), causing problems with decoding.

Figure 12:
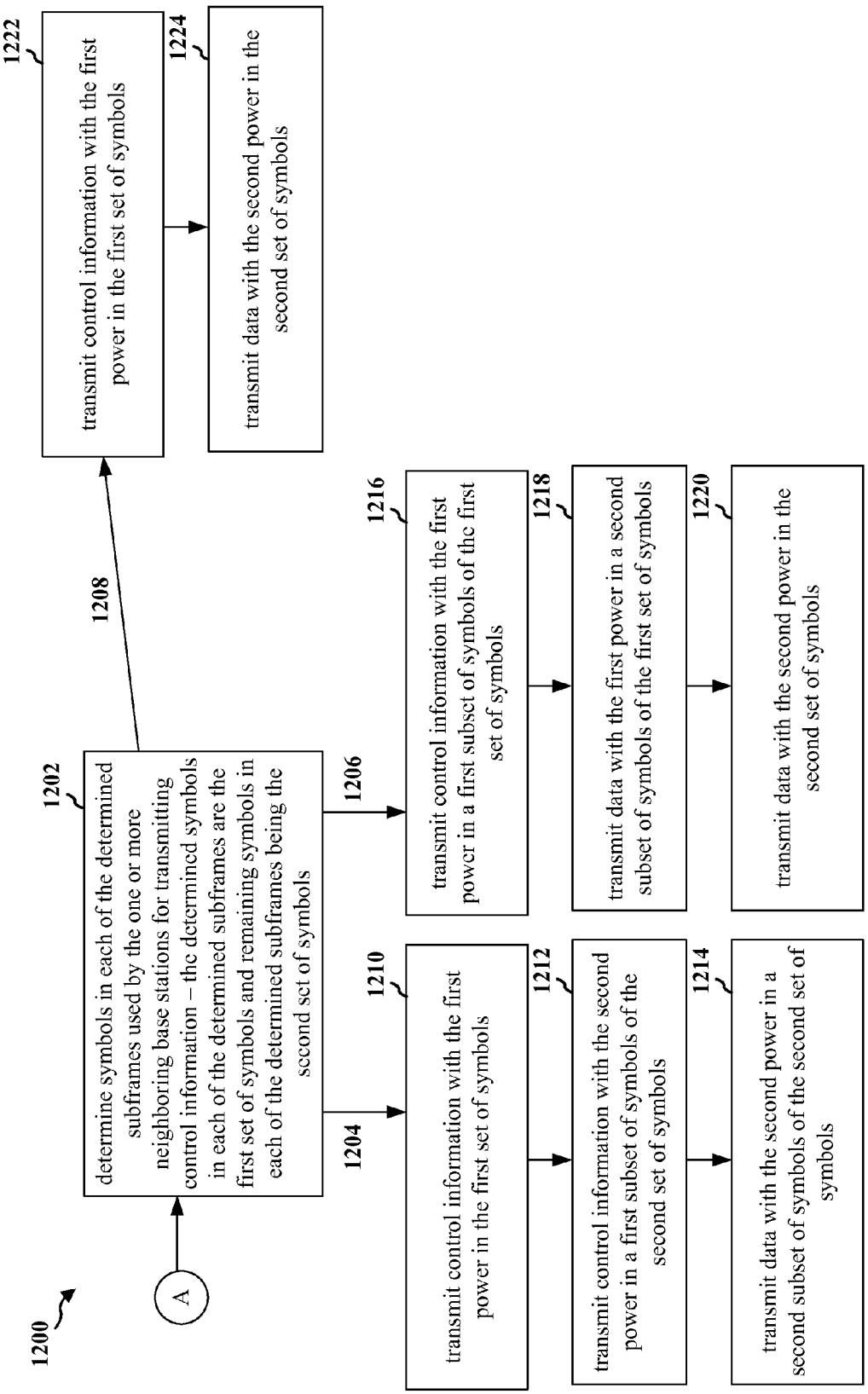
FIG. 12 is a flow chart of a third method of wireless communication.

FIG. 12 is a flow chart 1200 of a third method of wireless communication. The method may be performed by a base station/eNB, such as the eNB 806. FIG. 12 continues from point A of FIGS. 10, 11. In step 1202, the base station may determine symbols in each of the determined subframes used by the one or more neighboring base stations for transmitting control information. The determined symbols in each of the determined subframes are the first set of symbols and remaining symbols in each of the determined subframes are the second set of symbols. If the PDCCH/PHICH duration of the base station is greater than the PDCCH/PHICH duration of the one or more neighboring eNBs, path 1204 is followed. In step 1210, the base station transmits control information with the first power in the first set of symbols. In step 1212, the base station transmits control information with the second power in a first subset of symbols of the second set of symbols. In step 1214, the base station transmits data with the second power in a second subset of symbols of the second set of symbols. For example, referring to subframe 904 of FIG. 9, assume the PDCCH/PHICH duration of the base station is three OFDM symbols and the PDCCH/PHICH duration of the one or more neighboring eNBs is two OFDM symbols. Path 1204 will then be followed. Following path 1204, the base station transmits control information with the first power in the OFDM symbols 0, 1 (the first set of symbols includes symbols 0, 1 that are concurrent with MBSFN control symbols). The base station transmits control information with the second power in the OFDM symbol 2 of the OFDM symbols 2-13 (the second set of symbols includes symbols 2-13 that are concurrent with MBSFN PMCH symbols). The base station transmits data with the second power in OFDM symbols 3-13 of the OFDM symbols 2-13.

If the PDCCH/PHICH duration of the base station is equal to the PDCCH/PHICH duration of the one or more neighboring eNBs, path 1208 is followed. In step 1222, the base station transmits control information with the first power in the first set of symbols. In step 1224, the base station transmits data with the second power in the second set of symbols. The second power may be equal to zero such that no data is transmitted in the second set of symbols. For example, referring to subframe 906 of FIG. 9, assume the PDCCH/PHICH duration of the base station is two OFDM symbols and the PDCCH/PHICH duration of the one or more neighboring eNBs is also two OFDM symbols. Path 1208 will then be followed. Following path 1208, the base station transmits control information with the first power in the OFDM symbols 0, 1. The base station transmits data with the second power in the OFDM symbols 2-13.

If the PDCCH/PHICH duration of the base station is less than the PDCCH/PHICH duration of the one or more neighboring eNBs, path 1206 is followed. In step 1216, the base station transmits control information with the first power in a first subset of symbols of the first set of symbols. In step 1218, the base station transmits data with the first power in a second subset of symbols of the first set of symbols. In step 1220, the base station transmits data with the second power in the second set of symbols. For example, referring to subframe 908 of FIG. 9, assume the PDCCH/PHICH duration of the base station is one OFDM symbol and the PDCCH/PHICH duration of the one or more neighboring eNBs is two OFDM symbols. Path 1206 will then be followed. Following path 1206, the base station transmits control information with the first power in OFDM symbol 0 of the OFDM symbols 0, 1. The base station transmits data with the first power in OFDM symbol 1 of the OFDM symbols 0, 1. The base station transmits data with the second power in the OFDM symbols 2-13.

Figure 13:
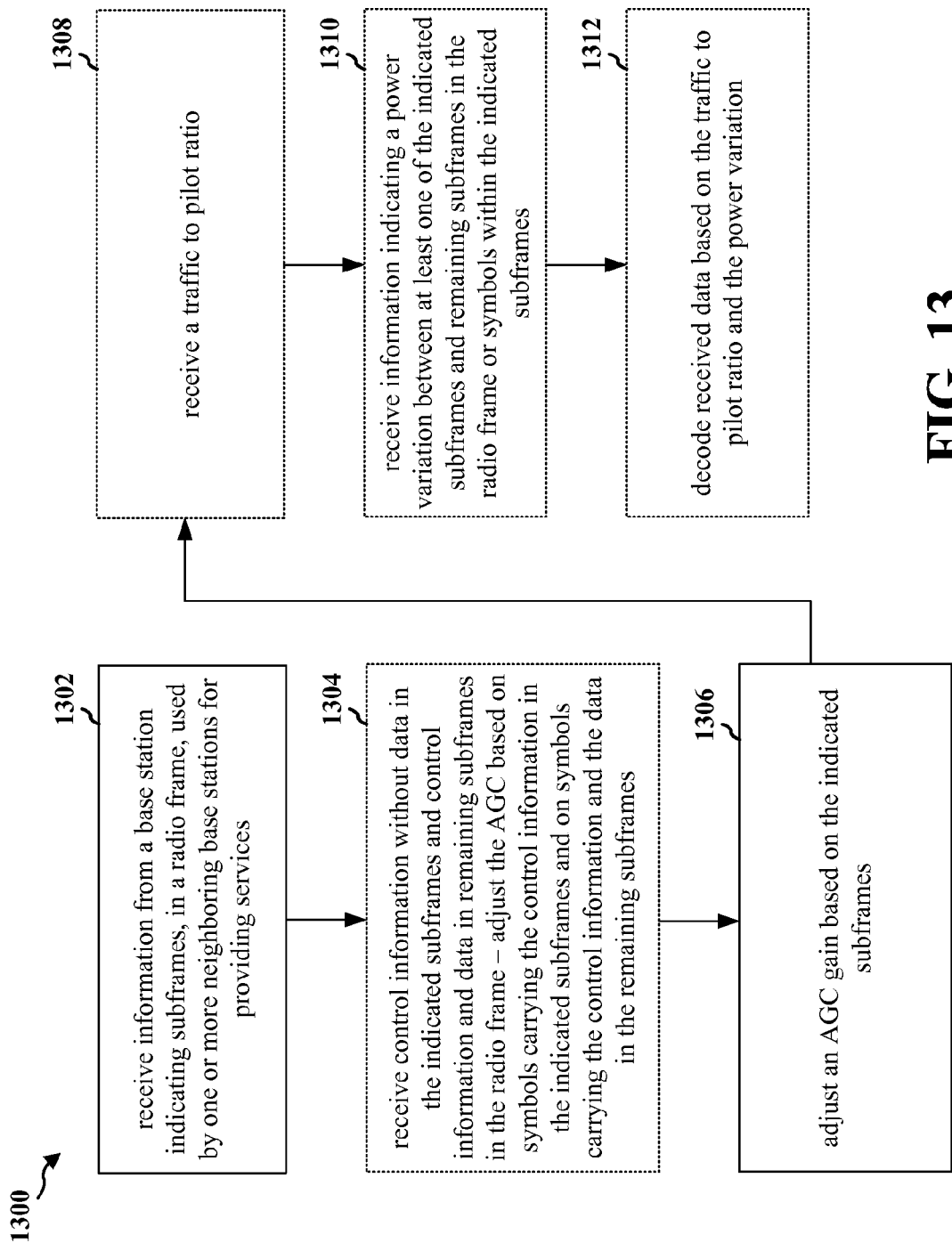
FIG. 13 is a flow chart of a fourth method of wireless communication.

FIG. 13 is a flow chart 1300 of a fourth method of wireless communication. The method may be performed by a UE, such as the UE 808. In step 1302, a UE receives information from a base station indicating subframes, in a radio frame, used by one or more neighboring base stations for providing services. In step 1306, the UE adjusts an AGC gain based on the indicated subframes. The information may further include a power variation between at least one of the indicated subframes and remaining subframes in the radio frame or symbols within the indicated subframes. In such a configuration, the AGC gain may be adjusted further based on the power variation. In step 1304, the UE may receive control information without data in the indicated subframes and control information and data in remaining subframes in the radio frame. The AGC gain in step 1306 may be adjusted based on symbols carrying the control information in the indicated subframes and on symbols carrying the control information and the data in the remaining subframes. In step 1308, the UE may receive a T/P ratio. In step 1310, the UE may receive information indicating a power variation between the indicated subframes and remaining subframes in the radio frame and/or symbols within the indicated subframes. In step 1312, the UE may decode received data based on the T/P ratio and the power variation. The indicated subframes may be concurrent with MBSFN subframes used by the one or more neighboring base stations for providing services.

For example, referring to FIG. 8, the UE 808 may receive information 810 from the eNB 806 indicating subframes 1, 2, 3, 6, 7, 8 in a radio frame are used by the eNBs 802, 804 for broadcasting MBSFN services. The UE 808 may then determine that the subframes 1, 2, 3, 6, 7, 8 within the radio frame 806' are reserved subframes. The UE 808 may adjust 812 an AGC gain based on the reserved subframes 1, 2, 3, 6, 7, 8. The information 810 may further include a power variation between the reserved subframes 1, 2, 3, 6, 7, 8 and remaining subframes 0, 4, 5, 9 in the radio frame 806' and/or between OFDM symbols within the reserved subframes 1, 2, 3, 6, 7, 8. Referring to FIG. 9, in the subframe 906, the UE 808 may receive control information without data (the restricted/reduced power for the data is zero) in the reserved subframes 1, 2, 3, 6, 7, 8 and control information and data in remaining subframes 0, 4, 5, 9 in the radio frame 902. The AGC gain may be adjusted based on the OFDM symbols 0, 1 carrying the control information in the reserved subframes 1, 2, 3, 6, 7, 8 and on OFDM symbols 0-13 carrying the control information and the data in the remaining subframes 0, 4, 5, 9. The UE 808 may receive a T/P ratio and information indicating a power variation between the reserved subframes 1, 2, 3, 6, 7, 8 and remaining subframes 0, 4, 5, 9 in the radio frame 806' and/or OFDM symbols within the reserved subframes 1, 2, 3, 6, 7, 8. The UE 808 may decode data received in the reserved subframes 1, 2, 3, 6, 7, 8 based on the T/P ratio and the power variation.

Figure 14:
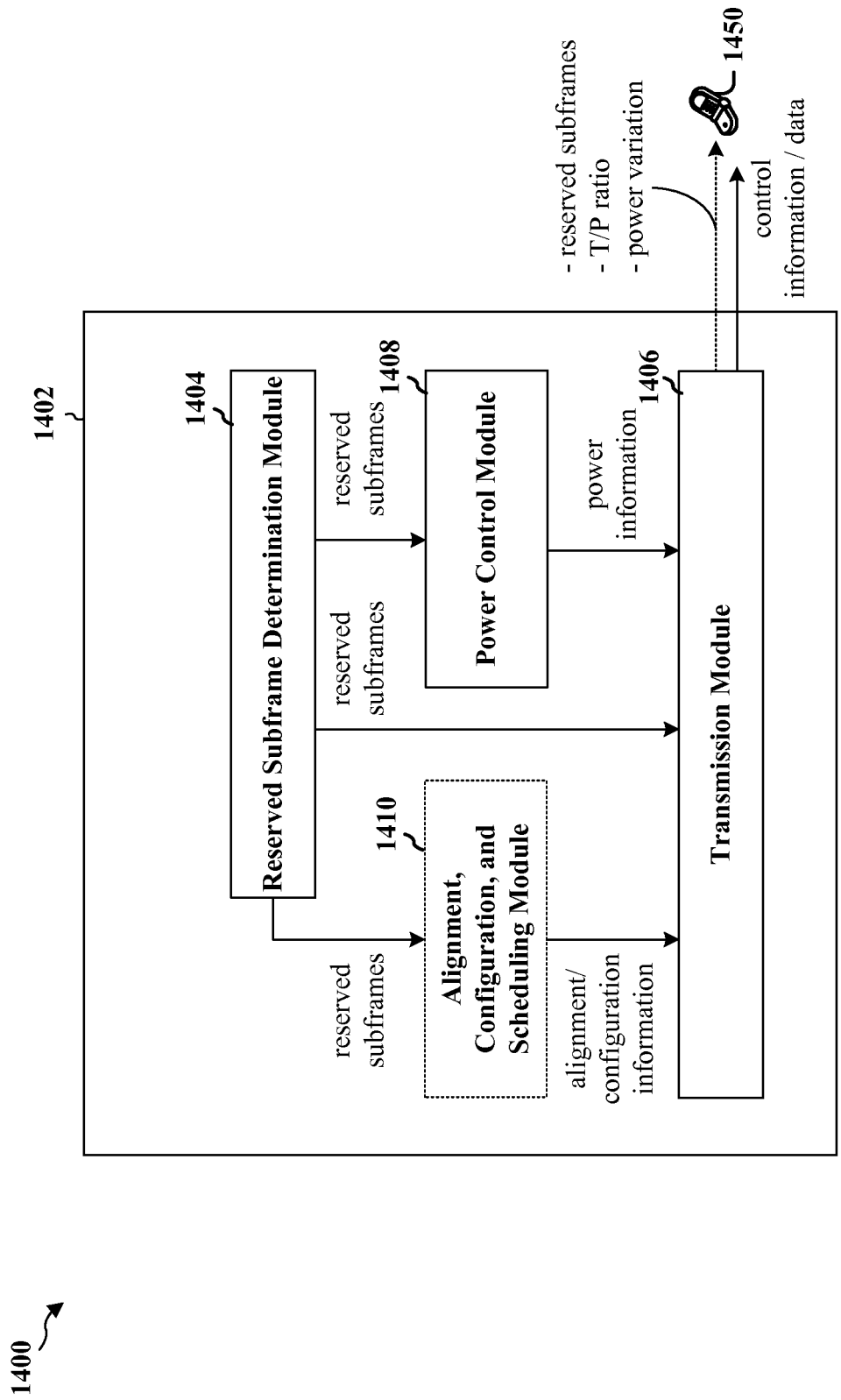
FIG. 14 is a conceptual data flow diagram illustrating the data flow between different modules/means/components in an exemplary eNB apparatus.

FIG. 14 is a conceptual data flow diagram 1400 illustrating the data flow between different modules/means/components in an exemplary eNB/base station apparatus 1402. The base station includes a reserved subframe determination module 1404 that may determine subframes, in a radio frame, used by one or more neighboring base stations for providing services. The reserved subframe determination module may determine the subframes used by one or more neighboring base stations for providing services through information provided by the one or more neighboring base stations (e.g., through a backhaul connection) or provided by some other network entity. The reserved subframe determination module 1404 may provide the reserved subframe information to a transmission module 1406, which may send information to a UE 1450 indicating the determined subframes. The information may further indicate a power variation between the determined subframes and remaining subframes in the radio frame and/or symbols within the determined subframes. The information may further indicate a T/P ratio. The reserved subframe determination module 1404 may provide the reserved subframe information to a power control module 1408, which may determine a first power and a second power. The power control module 1408 may provide the determined power information to the transmission module 1406, which may transmit control information and/or data in a first set of symbols in each of the determined subframes with a first power, and may transmit control information and/or data in a second set of symbols in each of the determined subframes with a second power. The first power may be equal to the second power. In such a configuration, the power control module 1408 may determine a third power and provide the power information to the transmission module 1406, which may transmit remaining subframes in the radio frame other than the determined subframes in the radio frame with a third power greater than the first power and the second power. The second power may be less than the first power. In such a configuration, the transmission module 1406 may transmit remaining subframes in the radio frame other than the determined subframes in the radio frame with the first power.

The reserved subframe determination module 1404 may determine symbols in each of the determined subframes used by the one or more neighboring base stations for transmitting control information. The determined symbols in each of the determined subframes may be the first set of symbols and remaining symbols in each of the determined subframes may be the second set of symbols. When the PDCCH/PHICH duration of the base station is greater than the PDCCH/PHICH duration of the one or more neighboring base stations, the transmission module 1406 may transmit control information with the first power in the first set of symbols, transmit control information with the second power in a first subset of symbols of the second set of symbols, and transmit data with the second power in a second subset of symbols of the second set of symbols. When the PDCCH/PHICH duration of the base station is equal to the PDCCH/PHICH duration of the one or more neighboring base stations, the transmission module 1406 may transmit control information with the first power in the first set of symbols, and transmit data with the second power in the second set of symbols. The second power may be equal to zero such that no data is transmitted in the second set of symbols. When the PDCCH/PHICH duration of the base station is less than the PDCCH/PHICH duration of the one or more neighboring base stations, the transmission module 1406 may transmit control information with the first power in a first subset of symbols of the first set of symbols, transmit data with the first power in a second subset of symbols of the first set of symbols, and transmit data with the second power in the second set of symbols. The determined subframes may concurrent with MBSFN subframes used by the one or more neighboring base stations. The symbols may be OFDM symbols.

The reserved subframe determination module 1404 may determine subframes, in a radio frame, used by one or more neighboring base stations for providing services. The reserved subframe determination module 1404 may provide reserved subframe information to the power control module 1408 and the transmission module 1406. The power control module 1408 may determine a first power for transmitting control information and/or data. The power control module 1408 may provide the determined power information to the transmission module 1406, which may transmit with a first power in remaining subframes other than the determined subframes in the radio frame. The power control module 1408 may determine a second power based on the first power such that a difference between the second power and the first power is less than a threshold. The second power may be less than the first power. The power control module 1408 may provide the determined power information to the transmission module 1408, which may transmit with the second power in a subset of symbols in the determined subframes.

The reserved subframe determination module 1404 may provide the reserved subframe information to an alignment, configuration, and scheduling module 1410. The alignment, configuration, and scheduling module 1410 may determine a number of symbols in each of the determined subframes used by the one or more neighboring base stations for transmitting control information, and determine to use an equal number of symbols or less symbols for transmitting control information than the determined number of symbols. The alignment, configuration, and scheduling module 1410 may refrain from configuring an extended PHICH duration and instead configure a normal PHICH duration. The alignment, configuration, and scheduling module 1410 may try to schedule UEs with QPSK rank 1 single user transmissions in the determined subframes.

The apparatus may include additional modules that perform each of the steps of the algorithm in the aforementioned flow charts of FIGS. 10-12. As such, each step in the aforementioned flow charts of FIGS. 10-12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
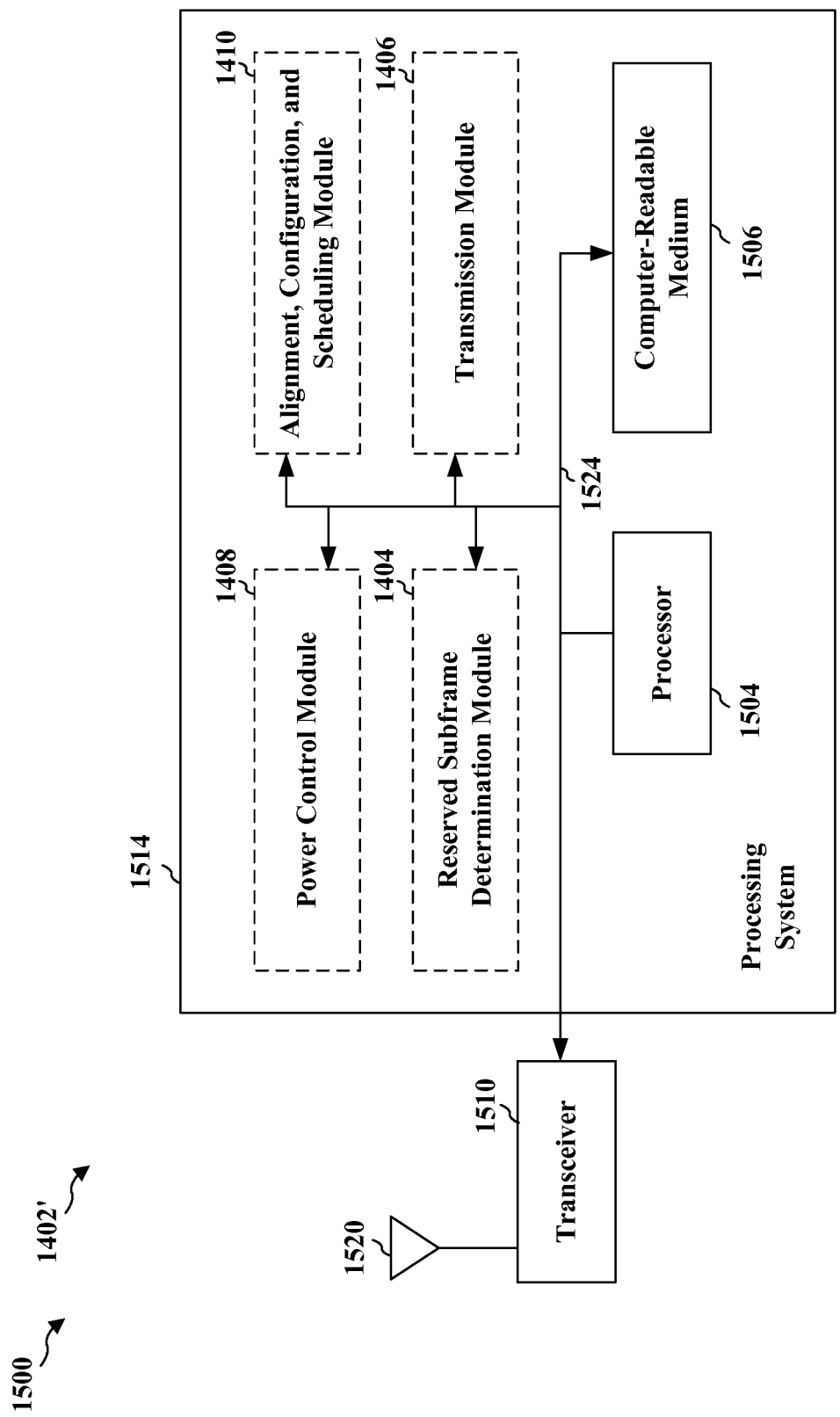
FIG. 15 is a diagram illustrating an example of a hardware implementation for an eNB apparatus employing a processing system.

FIG. 15 is a diagram 1500 illustrating an example of a hardware implementation for an eNB apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, and 1410. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In a first configuration, the apparatus 1402/1402' for wireless communication includes means for determining subframes, in a radio frame, used by one or more neighboring base stations for providing services. The apparatus further includes means for sending information to a UE indicating the determined subframes. The apparatus may further include means for transmitting at least one of control information or data in a first set of symbols in each of the determined subframes with a first power, and means for transmitting at least one of control information or data in a second set of symbols in each of the determined subframes with a second power. The first power may be equal to the second power. In such a configuration, the apparatus further includes means for transmitting remaining subframes in the radio frame other than the determined subframes in the radio frame with a third power greater than the first power and the second power. The second power may be less than the first power. In such a configuration, the apparatus further includes means for transmitting remaining subframes in the radio frame other than the determined subframes in the radio frame with the first power. The apparatus may further include means for determining symbols in each of the determined subframes used by the one or more neighboring base stations for transmitting control information. The determined symbols in each of the determined subframes may be the first set of symbols and remaining symbols in each of the determined subframes may be the second set of symbols. The means for transmitting in the first set of symbols and the second set of symbols in each of the determined subframes may include means for transmitting control information with the first power in the first set of symbols, means for transmitting control information with the second power in a first subset of symbols of the second set of symbols, and means for transmitting data with the second power in a second subset of symbols of the second set of symbols. The means for transmitting in the first set of symbols and the second set of symbols in each of the determined subframes may include means for transmitting control information with the first power in the first set of symbols, and means for transmitting data with the second power in the second set of symbols. The means for transmitting in the first set of symbols and the second set of symbols in each of the determined subframes may include means for transmitting control information with the first power in a first subset of symbols of the first set of symbols, means for transmitting data with the first power in a second subset of symbols of the first set of symbols, and means for transmitting data with the second power in the second set of symbols. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In a second configuration, the apparatus 1402/1402' for wireless communication includes means for determining a number of symbols in each of the determined subframes used by the one or more neighboring base stations for transmitting control information, and means for determining to use an equal number of symbols or less symbols for transmitting control information than the determined number of symbols. The apparatus may further include means for refraining from configuring an extended PHICH duration. The apparatus may further include means for scheduling UEs with QPSK rank 1 single user transmissions in the determined subframes. The apparatus may further include means for determining symbols in each of the determined subframes used by the one or more neighboring base stations for transmitting control information. The determined symbols in each of the determined subframes may be the first set of symbols and remaining symbols in each of the determined subframes may be the second set of symbols. The apparatus may further include means for transmitting control information with the first power in the first set of symbols. The means for transmitting with the second power in a subset of symbols in the determined subframes may include means for transmitting control information with the second power in a first subset of symbols of the second set of symbols, and means for transmitting data with the second power in a second subset of symbols of the second set of symbols. The apparatus may further include means for transmitting control information with the first power in the first set of symbols. The means for transmitting with the second power in a subset of symbols in the determined subframes may include means for transmitting data with the second power in the second set of symbols. The apparatus may include means for transmitting control information with the first power in a first subset of symbols of the first set of symbols, and means for transmitting data with the first power in a second subset of symbols of the first set of symbols. The means for transmitting with the second power in a subset of symbols in the determined subframes may include means for transmitting data with the second power in the second set of symbols. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
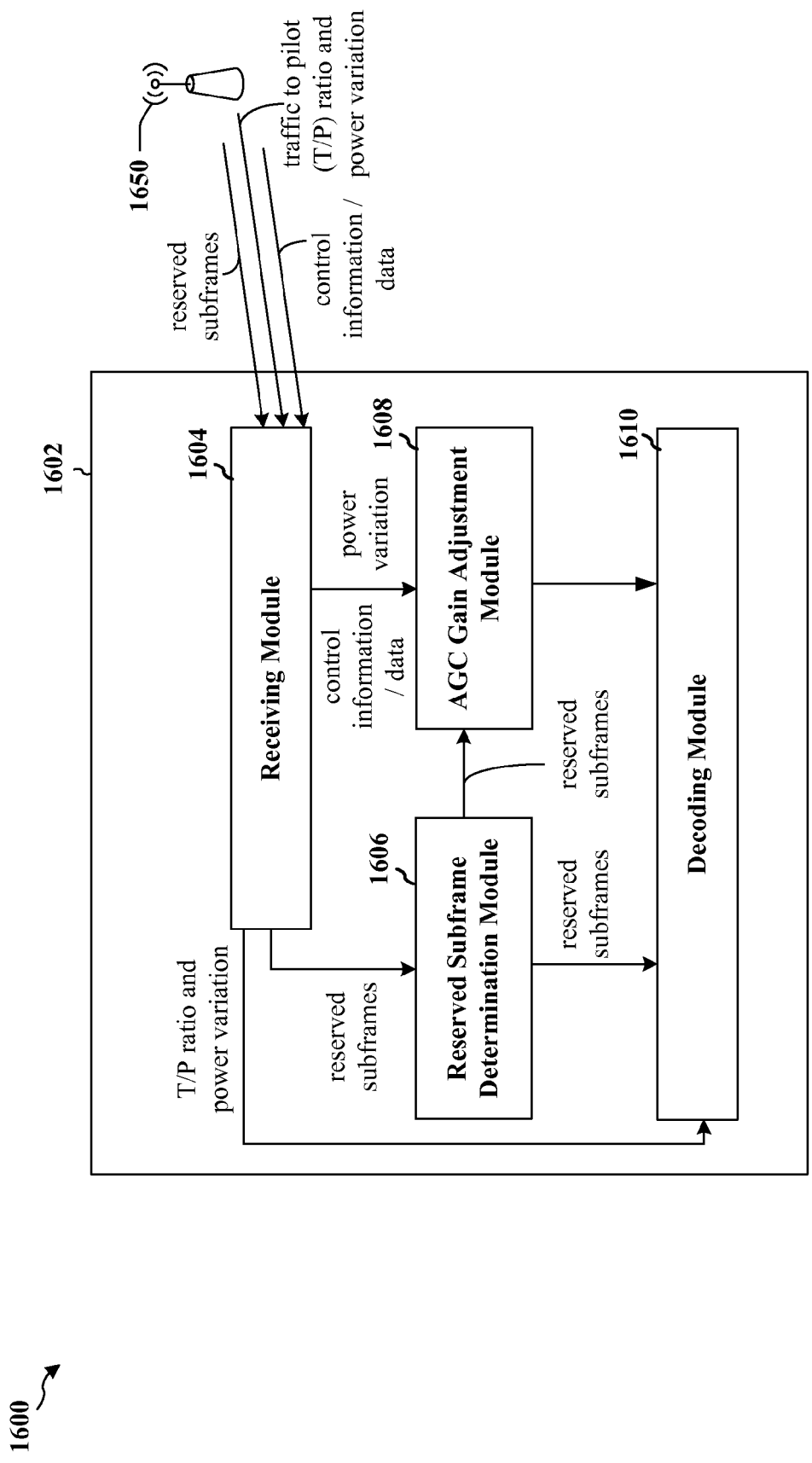
FIG. 16 is a conceptual data flow diagram illustrating the data flow between different modules/means/components in an exemplary UE apparatus.

FIG. 16 is a conceptual data flow diagram 1600 illustrating the data flow between different modules/means/components in an exemplary UE apparatus 1602. The UE 1602 includes a receiving module 1604, which receives control information/data from the base station 1650 and may receive information from a base station indicating subframes, in a radio frame, used by one or more neighboring base stations for providing services. The receiving module 1604 may provide the reserved subframe information to a reserved subframe determination module 1606, which determines which subframes are reserved subframes. The reserved subframe determination module 1606 may provide the reserved subframe information to an AGC gain adjustment module 1608. The receiving module 1604 may provide the control information/data to the AGC gain adjustment module 1608. The AGC gain adjustment module 1608 may adjust an AGC gain based on the indicated subframes. The received information may further include a power variation between at least one of the indicated subframes and remaining subframes in the radio frame or symbols within the indicated subframes. The receiving module 1604 may provide the power variation information to the AGC gain adjustment module 1608, which may adjust the AGC gain further based on the power variation. The receiving module 1604 may receive control information without data in the indicated subframes and control information and data in remaining subframes in the radio frame. In such a configuration, the AGC gain adjustment module 1608 may adjust the AGC gain based on symbols carrying the control information in the indicated subframes and on symbols carrying the control information and the data in the remaining subframes. The receiving module 1604 may receive a T/P ratio from the base station 1650. The receiving module 1604 may receive information indicating a power variation between at least one of the indicated subframes and remaining subframes in the radio frame or symbols within the indicated subframes. The receiving module 1604 may provide the T/P ratio and power variation information to a decoding module 1610, which may decode received data based on the T/P ratio and the power variation. The indicated subframes may be concurrent with MBSFN subframes used by the one or more neighboring base stations for providing services.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
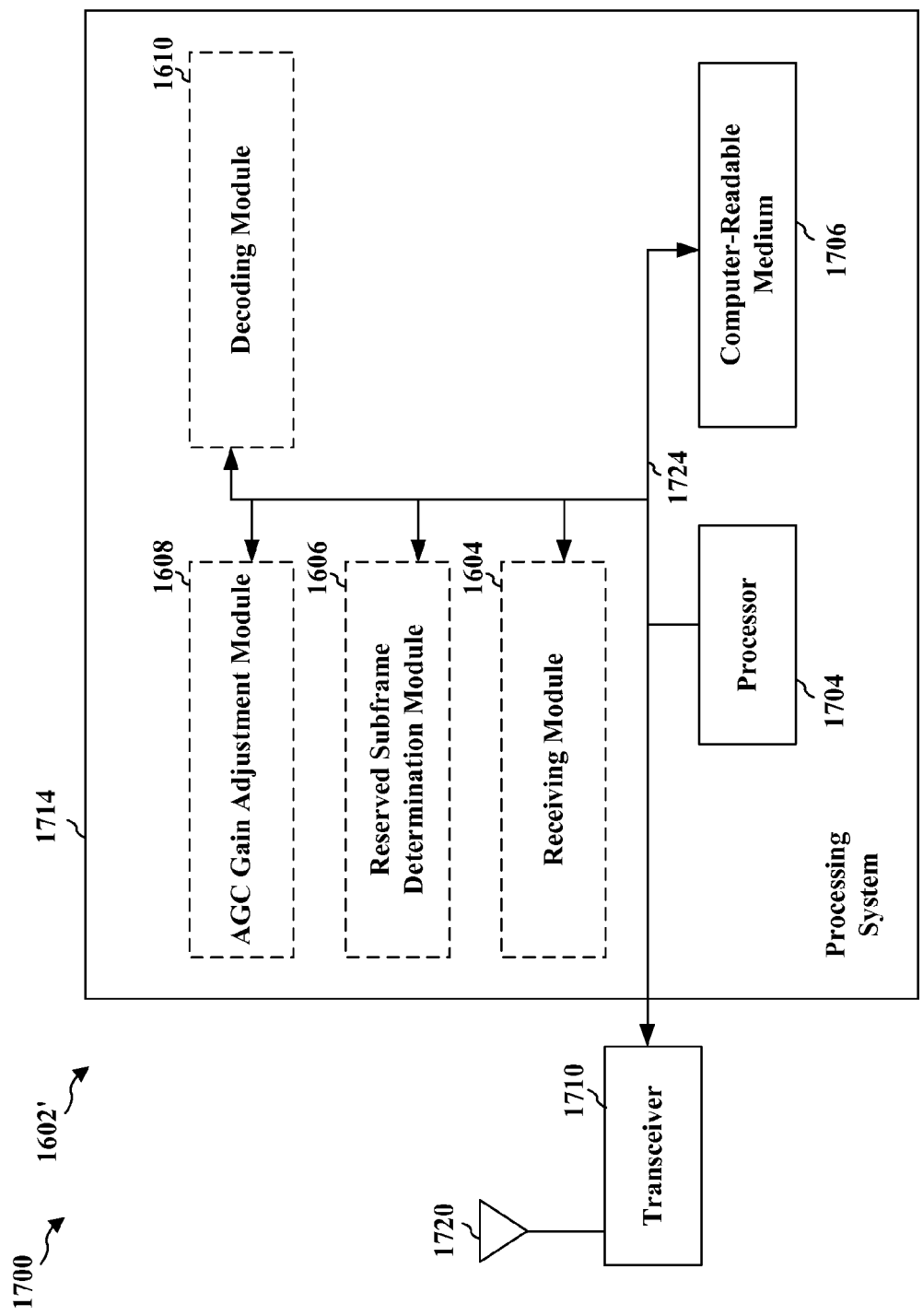
FIG. 17 is a diagram illustrating an example of a hardware implementation for an UE apparatus employing a processing system.

FIG. 17 is a diagram 1700 illustrating an example of a hardware implementation for an UE apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606, 1608, and 1610. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for receiving information from a base station indicating subframes, in a radio frame, used by one or more neighboring base stations for providing services. The apparatus further includes means for adjusting an AGC gain based on the indicated subframes. The apparatus may further include means for receiving control information without data in the indicated subframes and control information and data in remaining subframes in the radio frame. In such a configuration, the AGC gain is adjusted based on symbols carrying the control information in the indicated subframes and on symbols carrying the control information and the data in the remaining subframes. The apparatus may further include means for receiving a T/P ratio, means for receiving information indicating a power variation between at least one of the indicated subframes and remaining subframes in the radio frame or symbols within the indicated subframes, and means for decoding received data based on the T/P ratio and the power variation. The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Methods are provided supra for reducing UE AGC gain adjustment, decoding errors, and/or other issues related to reserved cell power variation across subframes/symbols in which a reserved cell transmits at a restricted/reduced power to reduce interference to MBSFN signals broadcasted by neighboring eNBs. The provided methods are also applicable to heterogeneous networks to reduce UE AGC gain adjustment, decoding errors, and/or other issues related to cell power variation across subframes/symbols in which an eNB transmits at a restricted/reduced power to reduce interference to neighboring eNBs providing unicast services.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station, comprising:
    determining subframes, in a radio frame, used by one or more neighboring base stations for providing services; and
    sending information to a user equipment (UE) indicating the determined subframes and indicating a power variation between a first set of symbols within the determined subframes that are concurrent with symbols carrying unicast information from the one or more neighboring base stations and a second set of symbols within the determined subframes that are concurrent with symbols carrying broadcast or multicast data from the one or more neighboring base stations;
    wherein the information indicating the determined subframes and the power variation is configured for an adjustment of an automatic gain control at the UE.

2. The method of claim 1, wherein the information further indicates a power variation between the determined subframes and remaining subframes in the radio frame.

3. The method of claim 1, further comprising:
    transmitting at least one of control information or data in a first set of symbols in each of the determined subframes with a first power; and
    transmitting at least one of control information or data in a second set of symbols in each of the determined subframes with a second power.

4. The method of claim 3, wherein the first power is equal to the second power, and the method further comprises transmitting remaining subframes in the radio frame other than the determined subframes in the radio frame with a third power greater than the first power and the second power.

5. The method of claim 3, wherein the second power is less than the first power.

6. The method of claim 5, further comprising transmitting remaining subframes in the radio frame other than the determined subframes in the radio frame with the first power.

7. The method of claim 5, further comprising determining symbols in each of the determined subframes used by the one or more neighboring base stations for transmitting control information, the determined symbols in each of the determined subframes being the first set of symbols and remaining symbols in each of the determined subframes being the second set of symbols.

8. The method of claim 7, wherein the transmitting in the first set of symbols and the second set of symbols in each of the determined subframes comprises:
    transmitting control information with the first power in the first set of symbols;
    transmitting control information with the second power in a first subset of symbols of the second set of symbols; and
    transmitting data with the second power in a second subset of symbols of the second set of symbols.

9. The method of claim 7, wherein the transmitting in the first set of symbols and the second set of symbols in each of the determined subframes comprises:
    transmitting control information with the first power in the first set of symbols; and
    transmitting data with the second power in the second set of symbols.

10. The method of claim 9, wherein the second power is equal to zero such that no data is transmitted in the second set of symbols.

11. The method of claim 7, wherein the transmitting in the first set of symbols and the second set of symbols in each of the determined subframes comprises:
    transmitting control information with the first power in a first subset of symbols of the first set of symbols;
    transmitting data with the first power in a second subset of symbols of the first set of symbols; and
    transmitting data with the second power in the second set of symbols.

12. The method of claim 1, wherein the determined subframes are concurrent with Multicast Broadcast Single Frequency Network (MBSFN) subframes used by the one or more neighboring base stations.

13. The method of claim 1, wherein the symbols are orthogonal frequency division multiplexing (OFDM) symbols.

14. A base station apparatus for wireless communication, comprising:

means for determining subframes, in a radio frame, used by one or more neighboring base stations for providing services; and means for sending information to a user equipment (UE) indicating the determined subframes and indicating a power variation between a first set of symbols within the determined subframes that are concurrent with symbols carrying unicast information from the one or more neighboring base stations and a second set of symbols within the determined subframes that are concurrent with symbols carrying broadcast or multicast data from the one or more neighboring base stations;

wherein the information indicating the determined subframes and the power variation is configured for an adjustment of an automatic gain control at the UE.

15. The apparatus of claim 14, wherein the information further indicates a power variation between the determined subframes and remaining subframes in the radio frame.

16. The apparatus of claim 14, further comprising:

means for transmitting at least one of control information or data in a first set of symbols in each of the determined subframes with a first power; and means for transmitting at least one of control information or data in the second set of symbols in each of the determined subframes with a second power.

17. The apparatus of claim 16, wherein the first power is equal to the second power, and the apparatus further comprises means for transmitting remaining subframes in the radio frame other than the determined subframes in the radio frame with a third power greater than the first power and the second power.

18. The apparatus of claim 16, wherein the second power is less than the first power.

19. The apparatus of claim 18, further comprising means for transmitting remaining subframes in the radio frame other than the determined subframes in the radio frame with the first power.

20. The apparatus of claim 18, further comprising means for determining symbols in each of the determined subframes used by the one or more neighboring base stations for transmitting control information, the determined symbols in each of the determined subframes being the first set of symbols and remaining symbols in each of the determined subframes being the second set of symbols.

21. The apparatus of claim 20, wherein the means for transmitting in the first set of symbols and the second set of symbols in each of the determined subframes comprises:

means for transmitting control information with the first power in the first set of symbols;

means for transmitting control information with the second power in a first subset of symbols of the second set of symbols; and means for transmitting data with the second power in a second subset of symbols of the second set of symbols.

22. The apparatus of claim 20, wherein the means for transmitting in the first set of symbols and the second set of symbols in each of the determined subframes comprises:

means for transmitting control information with the first power in the first set of symbols; and means for transmitting data with the second power in the second set of symbols.

23. The apparatus of claim 22, wherein the second power is equal to zero such that no data is transmitted in the second set of symbols.

24. The apparatus of claim 20, wherein the means for transmitting in the first set of symbols and the second set of symbols in each of the determined subframes comprises:

means for transmitting control information with the first power in a first subset of symbols of the first set of symbols;

means for transmitting data with the first power in a second subset of symbols of the first set of symbols; and means for transmitting data with the second power in the second set of symbols.

25. The apparatus of claim 14, wherein the determined subframes are concurrent with Multicast Broadcast Single Frequency Network (MBSFN) subframes used by the one or more neighboring base stations.

26. The apparatus of claim 14, wherein the symbols are orthogonal frequency division multiplexing (OFDM) symbols.

27. A base station apparatus for wireless communication, comprising:

a memory; and at least one processor coupled to the memory and configured to:

determine subframes, in a radio frame, used by one or more neighboring base stations for providing services; and send information to a user equipment (UE) indicating the determined subframes and indicating a power variation between a first set of symbols within the determined subframes that are concurrent with symbols carrying unicast information from the one or more neighboring base stations and a second set of symbols within the determined subframes that are concurrent with symbols carrying broadcast or multicast data from the one or more neighboring base stations;

wherein the information indicating the determined subframes and the power variation is configured for an adjustment of an automatic gain control at the UE.

28. A non-transitory computer-readable medium storing computer executable code for wireless communication, comprising code for:

determining subframes, in a radio frame, used by one or more neighboring base stations for providing services; and sending information to a user equipment (UE) indicating the determined subframes and indicating power variation between a first set of symbols within the determined subframes that are concurrent with symbols carrying unicast information from the one or more neighboring base stations and a second set of symbols within the determined subframes that are concurrent with symbols carrying broadcast or multicast data from the one or more neighboring base stations;

wherein the information indicating the determined subframes and the power variation is configured for an adjustment of an automatic gain control at the UE.

* * * * *